US012739247B2

(12) United States Patent
Rudd et al.

(10) Patent No.: US 12,739,247 B2
(45) Date of Patent: Sep. 15, 2026

(54) WAKING SILENT NETWORK DEVICES FOR AUTHENTICATION

(71) Applicant: HEWLETT PACKARD ENTERPRISE DEVELOPMENT LP, Spring, TX (US)

(72) Inventors: Jamie Rudd, Cheshire (GB); Christopher Hose, Westwood, NJ (US); Emilio Hoxha, Boston, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 63 days.

(21) Appl. No.: 18/791,070

(22) Filed: Jul. 31, 2024

(65) Prior Publication Data

US 2026/0039659 A1 Feb. 5, 2026

(51) Int. Cl.

| | |
|---|---|
| ***H04L 9/40*** | (2022.01) |
| ***H04L 12/46*** | (2006.01) |
| ***H04L 41/12*** | (2022.01) |

(52) U.S. Cl.

CPC ...... *H04L 63/0876* (2013.01); *H04L 12/4641* (2013.01); *H04L 41/12* (2013.01)

(58) Field of Classification Search

CPC .. H04L 63/0876; H04L 12/4641; H04L 41/12

See application file for complete search history.

(56) References Cited

U.S. PATENT DOCUMENTS 7,707,312 B2 * 4/2010 Rose ..................... H04L 12/467 709/224
8,219,800 B2 * 7/2012 Levy-Abegnoli ....... H04L 45/02 726/22

(Continued)

OTHER PUBLICATIONS

Commscope, "IP Subnet Address on Multiple Port-Based VLAN Configuration," Ruckus FastIron Layer 2 Switching Configuration Guide, 10.0.00, Published from CommScope Technical Content Portal, Nov. 17, 2023.

(Continued)

*Primary Examiner* — Sm A Rahman
(74) *Attorney, Agent, or Firm* — Hewlett Packard Enterprise Patent Department

(57) ABSTRACT

In certain implementations, a computer system includes a processor and a non-transitory computer-readable storage medium storing programming for execution by the processor. The programming includes instructions to detect a connection, associated with a second network device, to a first of multiple ports of a first network device. The second network device may be a silent network device in an unauthenticated state. The programming includes instructions to transmit automatically, in response to failure to receive a physical address of the second network device, a silent device discovery message to the second network device via the first port, and to receive, from the second network device in response to the silent device discovery message, a device discovery reply message associated with the physical address of the second network device. The programming includes instructions to initiate authentication of the second network device using the physical address of the second network device.

20 Claims, 8 Drawing Sheets

(56) References Cited

U.S. PATENT DOCUMENTS

| | | | | |
|---|---|---|---|---|
| 2006/0159025 | A1* | 7/2006 | Abdo | H04L 43/00 370/249 |
| 2009/0262718 | A1* | 10/2009 | Meier | H04W 12/062 370/338 |
| 2019/0104107 | A1* | 4/2019 | Da Silva Peixoto | H04L 12/413 |

OTHER PUBLICATIONS

Najeeb, Z. et al., "An Intelligent Self-Learning Algorithm for IP Network Topology Discovery," 2005 14th IEEE Workshop on Local & Metropolitan Area Networks, Crete, 2005, 6 pages.
Nazir, F. et al., "An Efficient Approach Towards IP Network Topology Discovery for Large Multi-subnet Networks," 11th IEEE Symposium on Computers and Communications *ISCC'06), Cagliari, Italy, 2006, pp. 989-993, 5 pages.
Pandey, S. et al., "IP Network Topology Discovery Using SNMP," 2009 International Conference on Information Networking, Chiang Mai, Thailand, 2009, pp1-5, 5 pages.
Serverfault, "Can MAC addresses be learned from received ICMP echo replies?," Feb. 16-17, 2021, 3 pages, downloaded Nov. 17, 2023, from https://serverfault.com/questions/1053890/can-mac-addresses-be-learned-from-received-icmp-echo-replies.

* cited by examiner

400

| | 402a | 402b | 402c | 402d | 402e | 402f | 402g |
|---|---|---|---|---|---|---|---|
| | VLAN ID | IP/MASK | BROADCAST | DIRECTED PING WITH/WITHOUT MAC | PING RANGE | SOURCE MAC | SDDP? |
| 404a | 10 | 10.0.10.1/24 | 10.0.10.255 | [10.0.10.22,aa:aa:aa:aa:aa:aa], [10.0.10.33] | 10.0.10.15-10.0.10.20 | aa:bb:cc:dd:ee:ff | YES |
| 404b | 20 | 10.0.20.1/24 | 10.0.20.255 | NO | | aa:bb:cc:dd:ee:ff | NO |
| 404c | 30 | 10.0.30.1/24 | 10.0.30.255 | N/A | | aa:bb:cc:dd:ee:ff | YES |

| | 408a | 408b | 408c | 408d | 408e | 408f | 408g |
|---|---|---|---|---|---|---|---|
| | ATTEMPT | SOURCE MAC | DESTINATION MAC | SOURCE IP | DESTINATION IP | BROADCAST | TYPE |
| 410a | 1 | aa:bb:cc:dd:ee:ff | aa:aa:aa:aa:aa:aa | 10.0.10.1 | 10.0.10.22 | 10.0.10.255 | DIRECT |
| 410b | 2 | aa:bb:cc:dd:ee:ff | ff:ff:ff:ff:ff:ff | 10.0.10.1 | 10.0.10.33 | 10.0.10.255 | DIRECT |
| 410c | 3 | aa:bb:cc:dd:ee:ff | ff:ff:ff:ff:ff:ff | 10.0.10.1 | 10.0.10.255 | 10.0.10.255 | BROADCAST |
| 410d | 4-10 | aa:bb:cc:dd:ee:ff | ff:ff:ff:ff:ff:ff | 10.0.10.1 | 10.0.10.15 – 10.0.10.20 | 10.0.10.255 | RANGE |
| 410e | 11 | aa:bb:cc:dd:ee:ff | ff:ff:ff:ff:ff:ff | 10.0.30.1 | 10.0.30.255 | 10.0.30.255 | BROADCAST |

FIGURE 4B

WAKING SILENT NETWORK DEVICES FOR AUTHENTICATION

BACKGROUND

Communication networks are a pervasive part of the daily operations of businesses of all sizes. A communication network may include various electronic devices, such as client devices, access points (APs), gateways, network controllers, routers, switches, and network management systems (NMSs) that are able to communicate with one another via one or more communication interfaces. The communication network may be a wired communication network, a wireless communication network, or a combination of wired and wireless communication networks.

BRIEF DESCRIPTION OF THE DRAWINGS

For a more complete understanding of this disclosure, and advantages thereof, reference is now made to the following descriptions taken in conjunction with the accompanying drawings, in which:

FIGS. 4A-4B illustrate examples of network information, according to certain implementations;

DESCRIPTION

Figure 1:
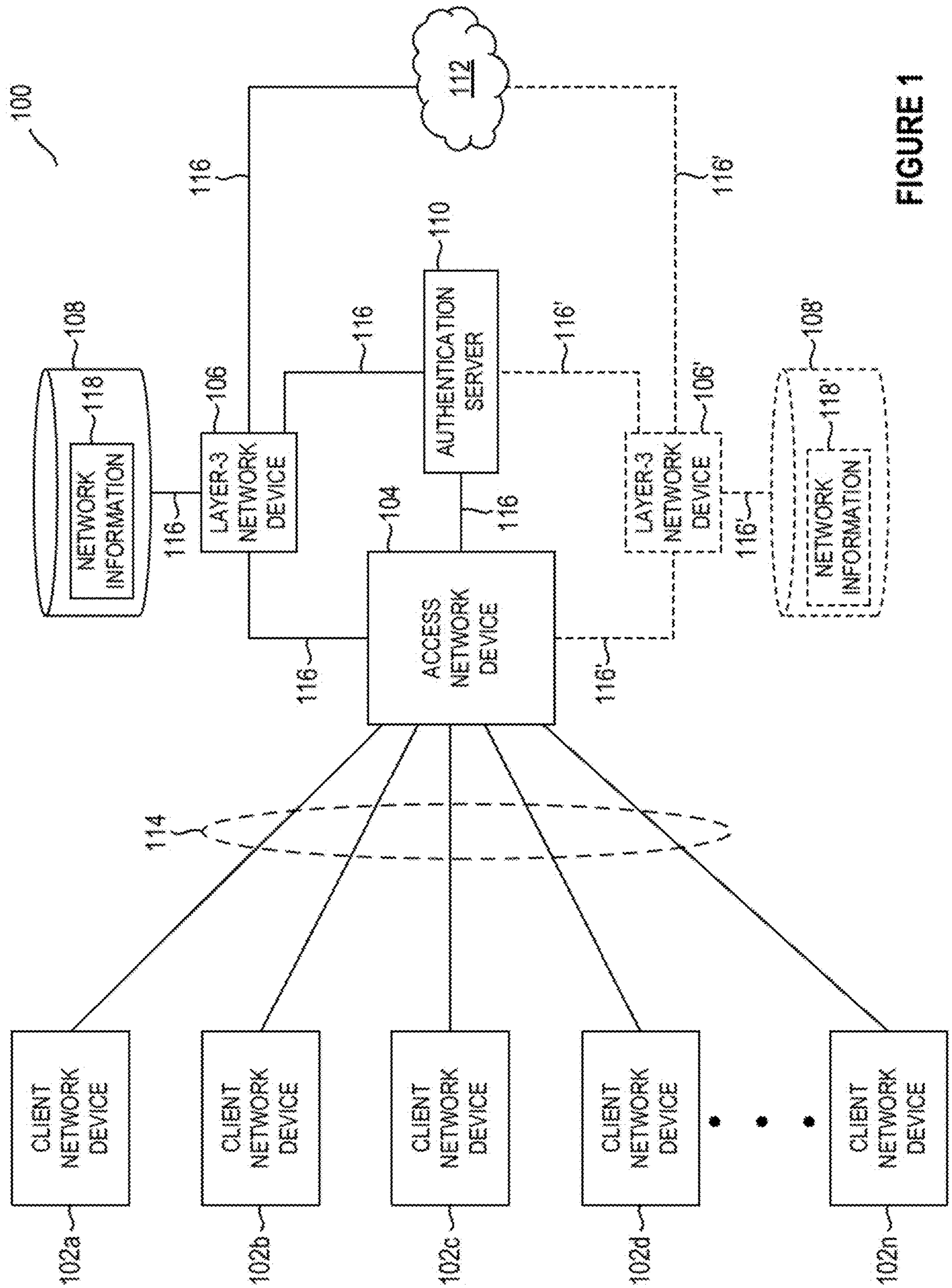
FIG. 1 illustrates an example system for waking silent network devices for authentication, according to certain implementations.

An access network device or other suitable network device may include multiple ports (sometimes referred to as a switchports) to which other network devices (e.g., referred to as client devices) may be connected to access and/or be accessible over a communication network to which the access network device is configured to provide access. These ports may include Ethernet ports and/or any other suitable types of ports. To connect to a communication network, network devices (e.g., client devices) may be coupled via a wired connection to a port of an access network device (e.g., an access switch).

For any of a variety of reasons, it may be desirable to learn certain information about client devices that are connected to a communication network such as via a port of an access network device. As an example, to promote security of the communication network, network policies may specify that client devices coupled to a port of network device (e.g., a port of an access network device) are to be authenticated prior to permitting traffic to be communicated (e.g., sent and/or received) via the port with the client device. Thus, an access network device and/or another network device may implement port security to control access to the communication network. According to certain switchport security policies, detection of a connection (e.g., link) to a port may be permitted, but the port may be blocked until either an 802.1x or MAC address handshake is received that authenticates the network device coupled to the port. This may be referred to as port authentication, and may be a feature that is active in certain networking environments.

To initiate the authentication, an access network device or other suitable network device may learn the identities of client devices that connect to a port of the access network device by detecting a connection to the port and obtaining certain information about the client device, including a physical address of the device. The physical address may be a hardware address of the device, such as a media access control (MAC) address, which also may be referred to as an Ethernet identifier (ID) in some implementations. The MAC address may be associated with a network interface card (NIC) of the network device. The access network device then may use the information obtained about the client device (e.g., including the physical address) to facilitate authentication of the client device, which may include providing the obtained information to an authentication network device (e.g., a remote authentication dial-in service (RADIUS) server) that will perform the authentication. Authenticating the client device also may be referred to as authenticating the switchport to which the client device is connected.

Some client devices that are to connect to a communication network are configured to communicate using dynamic host configuration protocol (DHCP), which may allow the client device to proactively request an Internet Protocol (IP) address from another network device of the communication network. In general, DHCP is a network management protocol used on IP networks for automatically assigning IP addresses and/or other communication parameters to devices connected to the network using a client-server architecture. As part of such a proactive request, the client device may provide the MAC address of the client to the network device, which may kick start the above-described authentication process.

Certain types of client devices, however, may be considered silent network devices. In certain implementations, a silent network device may include a network device (e.g., an Ethernet device) that is statically assigned an IP address, and does not automatically provide its MAC address or request its IP address and/or gateway IP address when connected to an access network device. For example, in certain implementations, a silent network device might not be configured for DHCP communication. As another example, in certain implementations, certain silent network devices might not be configured to gratuitously execute an address resolution protocol (ARP) procedure for an IP address and/or a gateway IP address. As a result, such silent network devices may fail to adequately initiate the authentication process. Although silent network devices may be any suitable types of network devices, some examples of silent network devices include legacy devices (e.g., legacy programmable logic controller (PLC) devices, legacy printers, etc.), certain Internet-of-Things (IoT) devices, and/or other suitable types of devices.

Certain implementations of this disclosure provide techniques for waking a silent network device coupled to a port of an access network device to cause the silent network device to provide an associated physical address (e.g., a MAC address) of the silent network device, and to thereby facilitate authenticating the silent network device. In certain implementations, an access network device triggers forced learning of a silent network device connected at a port of the access network device (e.g., registering of the physical address (e.g., MAC address) of the silent network device). The access network device may detect a connection to one of the ports of the access network device. In this example, the connection is for a silent network device that is in an unauthenticated state. In response to failure to receive a physical address of the silent network device and to cause the silent network device to wake up and provide its physical address, the access network device may transmit automatically a silent device discovery message to the silent network device via the port to which the silent network device is connected.

The access network device may send this silent device discovery message in any suitable format. In certain implementations, the silent device discovery message is an Internet Control Message Protocol (ICMP) echo request message. The access network device may send this silent device discovery message using one or more of various techniques. In certain implementations, transmitting the silent device discovery message may include broadcasting the silent device discovery message to a subnet associated with the silent network device. In certain implementations, transmitting the silent device discovery message includes transmitting the silent device discovery message as a direct ping message to a subnet associated with the silent network device. In certain implementations, transmitting the silent device discovery message may include transmitting a ping range to a subnet associated with the silent network device. These techniques may be used in combination with one another and/or other techniques, if possible, to increase the probability of waking the silent network device and obtaining the associated physical address (e.g., MAC address) of the silent network device. For example, the access network device may transmit multiple silent device discovery messages using different transmission techniques (e.g., broadcast, direct, and or ping range) to increase the chances that the silent network device responds.

The silent network device may receive the silent device discovery message and, in response, send a discovery reply message to the access network device. The silent network device may send this discovery reply response message in any suitable format. In certain implementations, the discovery reply message is an ICMP echo reply message. The discovery reply message may include any suitable information. For example, the discovery response message may include the physical address (e.g., MAC address) of the silent network device.

In response to receiving the discovery reply message, the access network device may facilitate authentication of the silent network device, which, if successfully authenticated, may place the switchport to which the silent network device is connected in an authenticated state. In certain implementations, the access network device may interact with an authentication network device (e.g., an authentication server, such as a RADIUS server) to facilitate authentication of the silent network device using the physical address obtained by the access network device.

Some communication networks include multiple virtual local area networks (VLANs), a feature that certain implementations of this disclosure can accommodate. For example, the silent network device may reside on a particular VLAN of the communication network.

In certain implementations, to facilitate waking up the silent network device, the access network device may obtain certain network information from another network device (e.g., a Layer-3 network device, such as a gateway, (core) switch, firewall), which may allow the access network device to obtain information regarding the Layer-3 networks (e.g., VLANs) on which the silent network device may reside. To that end, certain implementations of the disclosed solution apply a client-server model where each silent network device and its associated network information are defined in a mapping that may be stored by the Layer-3 network device, such as in a JSON dictionary or other suitable data structure. The access network device may act as the client and download this mapping from the Layer-3 network device, and then transmit, according to the obtained mapping, the silent device discovery message on an edge port of the access network device to trigger the silent network device to respond, which thereby allows the access network device to obtain the physical address (e.g., MAC address) of the silent network device. The network information stored by the Layer-3 network device may include the list of VLAN IDs, IP addresses, subnets, and/or MAC addresses.

In certain implementations, the access network device may transmit the silent device discovery message to the silent network device on an unassigned native VLAN. Because the silent network device is in an unauthenticated state, communicating the silent device discovery message to the silent network device on an unassigned native VLAN may allow the silent device discovery message to be communicated via the port to the silent network device (e.g., via any of the above-discussed techniques) such that the silent network device can receive the silent device discovery message. In some implementations, and according to the network information obtained from the Layer-3 network device, the access layer device may transmit the silent device discovery message to the second network device by transmitting multiple silent device discovery messages on an unassigned native VLAN but masquerading as being transmitted on one or more other VLANs on which the silent network device may reside.

One or more commands may be used to configure the access network device and/or the Layer-3 network device for silent network device discovery. The commands may include global commands for the access network device and/or Layer-3 network device, VLAN interface commands for the Layer-3 network device, switchport interface commands for the access network device, and/or any other suitable commands. Although described separately, the access network device, the Layer-3 network device, and the authentication network device may be three separate physical network devices or combined into one or more physical network devices.

Certain implementations may provide one or more technical advantages. Certain implementations allow statically configured silent devices (e.g., certain legacy devices) to be authenticated using dynamic port authentication. For example, certain implementations provide an automated technique for discovering a physical address of a silent network device coupled to a port of a network switch, and to thereby allow the silent network device to be authenticated (e.g., allow dynamic port authentication). Certain implementations provide a streamlined consistent and simplified deployment approach. For example, certain implementations provide a solution that works across a variety of devices, reducing or eliminating specific workarounds for particular devices and/or communication protocols.

Turning to the figures, FIG. 1 illustrates an example system 100 for waking silent network devices for authentication, according to certain implementations. In the illustrated example, system 100 includes client network devices 102*a*-102*n*, access network device 104, layer-3 network device 106, a storage device 108, an authentication server 110, and a network 112. Although this particular implementation of system 100 is illustrated and described, this disclosure contemplates system 100 being implemented in any suitable manner, according to particular needs.

In general, access network device 104 is configured to attempt, according to information obtained from layer-3 network device 106, to wake a silent client network device 102 that is in an unauthenticated state to cause the silent client network device 102 to provide a physical address of the client network device 102 for use in authenticating the client network device 102 (e.g., via authentication server 110) for accessing network 112. The capability/configuration for detection according to certain implementations of this disclosure may be referred to as the silent device discovery protocol (SDDP). These and other details are described in greater detail below.

Client network devices 102*a*-102*n*, which may be referred to generally as client network devices 102 or as client network device 102, may include any suitable types of electronic processing devices available, or to be made available, for communication via network 112. As just some examples, client network devices 102 include any suitable combination of end user devices (e.g., desktop computers, laptops, smartphones, tablets), network peripherals (e.g., printers, network attached storage (NAS) devices, IP cameras), Voice over IP equipment (e.g., IP phones, VoIP adapters), IoT devices (e.g., smart sensors, building automation systems, industrial control systems), media devices (e.g., smart TVs, video conferencing systems, digital signage), other networking equipment (e.g., unmanaged switches, network appliances), servers (e.g., local file servers, print servers, application servers), specialized equipment (e.g., point-of-sale systems, medical devices, industrial equipment with network capabilities), and/or other suitable network devices that are able to communicate with one another via one or more communication interfaces. As just a few particular examples, client network devices may include legacy PLC controllers, legacy printers, and IoT devices. Client network devices 102 might or might not be end user devices. One or more of client network devices 102 may be devices (e.g., a wireless access point) that provide network accessibility to other devices. Although FIG. 1 shows system 100 to include a particular number of client network devices 102, system 100 may include any suitable number of client network devices 102.

Access network device 104 may include a device to which client network devices 102 connect to connect to network 112. In some configurations, access network device 104 may serve as an entry point for client network devices 102 to network 112. In certain implementations, access network device 104 is a Layer-2 network device that operates primarily at the Data Link Layer (Layer 2) of the OSI model and is used to connect other network devices (e.g., client network devices 102) to a network (e.g., network 112). For example, access network device 104 may be an access switch or other suitable type of network device. As just two particular examples, access network device 104 could be an Ethernet switch or a network bridge. Access network device 104 may be configured to forward network communications (e.g., frames) and/or create collision domains and broadcast domains. Access network device 104 may provide certain capabilities such as MAC address learning and forwarding, VLAN support, and/or port security.

Access network device 104 may include one or more ports to which client network devices 102 may connect. Client network devices 102 may connect to access network device 104 (e.g., to a port of access network device 104) using one or more communication links 114. Although this disclosure contemplates communication links 114 being any suitable type of connection, in certain implementations, some or all of communication links 114 are wired connections to corresponding ports of access network device 104. Additionally, the types of wired connections for communication links 114 may depend on the types of ports and associated communication interfaces of client network devices 102 and access network device 104. In certain implementations, one or more of communication links 114 may be Ethernet cables.

Layer-3 network device 106 may include a device to which access network device 104 connects to facilitate connection to network 112. In certain implementations, layer-3 network device 106 is a Layer-3 network device that operates primarily at the Network Layer (Layer 3) of the OSI model and is used to connect other network devices (e.g., client network devices 102) to a network (e.g., network 112) via a Layer 2 network device (e.g., access network device 104). For example, layer-3 network device 106 may be a network device that handles complex routing decisions, including network traffic aggregation and distribution. As just a few particular examples, layer-3 network device 106 could be a core router, a multilayer switch, a gateway, a firewall, or another suitable type of layer-3 network device. Layer-3 network device 106 may be configured to execute advanced routing protocols (e.g., Open Shortest Path First (OSPF), Border Gateway Protocol (BGP), and/or any other suitable routing protocol, including any standardized or vendor-specific routing protocols); provide high port density and throughput; provide virtual routing and forwarding; support multiprotocol label switching (MPLS); and/or support IPv4, IPv6, and/or beyond.

Layer-3 network device 106 may be coupled to a storage device 108. Although illustrated separately from layer-3 network device 106, layer-3 network device 106 may include storage device 108 in certain implementations. Storage device 108 may take the form of volatile or non-volatile memory including, without limitation, magnetic media, optical media, read-access memory (RAM), read-only memory (ROM), removable media, or any other suitable memory component. In certain implementations, a portion or all of storage device 108 may be or include a database, such as one or more structured query language (SQL) servers or relational databases. Although referred to in the singular, storage device 108 may be multiple storage devices at one or more locations.

Storage device 108 may store network information 118. Network information 118 may include any suitable information about system 100, including information about Layer-3 interfaces for system 100.

In certain implementations, system 100 (e.g., access network device 104, layer-3 network device 106, network 112, etc.) may implement one or more VLANs. In general, VLANs provide a technique for segmenting a network into (possibly related) groups, which may improve efficiency of traffic flow and/or limit the propagation of multicast and broadcast messages. In certain implementations, on an individual network device (e.g., switch), traffic between VLANs may be blocked unless the VLANs are connected by a router, which may increase security.

In certain implementations, a VLAN may be a group of ports designated by the switch as belonging to a same broadcast domain. For example, ports carrying traffic for a particular subnet address may belong to the same VLAN. In certain implementations, a same port may be used for two or more VLANs. Using a VLAN may allow users to be grouped by logical function rather than physical location, which may help control bandwidth usage by allowing high-bandwidth users to be grouped on low-traffic segments and users from different local area network (LAN) segments to be grouped for access to common resources. As just one particular example, each VLAN could be a network that corresponds to different groups within a company (e.g., the IT group, the Marketing group, and the Finance group).

Returning to network information 118, as an example, network information 118 may include information about VLANs implemented by system 100, IP address/subnet mask information, techniques for contacting devices connected within system 100 (e.g., via broadcast pings, directed pings, ping ranges, etc.), IP address range information, source MAC address information, indications of whether certain VLANs or other network segments are capable of communicating using the SDDP, and/or any other suitable information. An example of network information 118 is illustrated in and described below with respect to FIG. 4A.

Continuing with FIG. 1, system 100 may include authentication server 110. Authentication server 110 may be configured to authenticate client network devices 102 for connection to network 112. Authentication server 110 may be one or more computer devices that provide authentication services for users and/or devices (e.g., client network devices 102) attempting to connect to or otherwise access network 112. In certain implementations, authentication server 110 may be a remote authentication dial-in service (RADIUS) server that is configured to authenticate client network devices 102. Authenticating a client network device 102 also may be referred to as authenticating the switchport (of access network device 104) to which the client network device 102 is connected. Thus, authentication requests communicated by access network device 104 and/or layer-3 network device 106 may be RADIUS requests.

Network 112 may be any suitable type of communication network for electronic devices, and may facilitate wired and/or wireless communication. Network 112 may communicate, for example, IP packets, Frame Relay frames, ATM cells, voice, video, data, and other suitable information between network addresses. Network 112 may include any suitable combination of one or more LANs, radio access networks (RANs), metropolitan area networks (MANs), wide area networks (WANs), mobile networks (e.g., using WiMax (802.16), WiFi (802.11), 3G, 4G, 5G, or any other suitable wireless technologies in any suitable combination), all or a portion of the global communication network known as the Internet, and/or any other communication system or systems at one or more locations, any of which may be any suitable combination of wireless and wired. Network 112 may include controllers, APs, switches, routers, firewalls, or the like for forwarding traffic. In certain implementations, at least a portion of network 112 may be an Ethernet network.

Access network device 104, layer-3 network device 106, storage device 108, authentication server 110, and network 112 may be communicatively coupled using one or more communication links 116. Communication links 116 may include any suitable combination of wired or wireless communication links, such as any suitable combination of an Ethernet connection, a Wi-Fi connection, a cellular connection, a satellite link, an ACARS link, and/or any other suitable type of communication link.

One or more of client network devices 102 may be so-called silent network devices. As described above, a silent network device may include a network device (e.g., an Ethernet device) that is statically assigned an IP address, and does not automatically provide its MAC address or request its IP address and/or gateway IP address when connected to an access network device. For example, in certain implementations, a silent network device might not be configured for DHCP communication. As another example, in certain implementations, a silent network device might not be configured to gratuitously execute an ARP procedure for an IP address and/or a gateway IP address. As a result, such silent network devices may fail to adequately initiate the authentication process. Although silent network devices may be any suitable types of network devices, some examples of silent network devices include legacy devices (e.g., legacy programmable logic controller (PLC) devices, legacy printers, etc.), certain Internet-of-Things (IoT) devices, and/or other suitable types of devices.

In operation of an example implementation of system 100, access network device 104 is configured to attempt, according to information obtained from layer-3 network device 106, to wake a silent client network device 102 that is in an unauthenticated state to cause the silent client network device 102 to provide a physical address of the client network device 102 for use in authenticating the client network device 102 (e.g., via authentication server 110) for accessing network 112. For purposes of this example operation it will be assumed that a particular client network device 102 (e.g., referred to simply as client network device 102) initially is a silent network device and is in an unauthenticated state.

According to the example operation, in certain implementations, access network device 104 may detect a connection to a particular port of access network device 104. The connection may be via a communication link 114 and may be associated with a client network device 102. The client network device 102 may be a silent network device that is in an unauthenticated state. Access network device 104 may obtain at least a portion of the network information 118 from layer-3 network device 106.

Access network device 104 may transmit automatically, in response to failure to receive a physical address of the client network device 102, a silent device discovery message to the client network device 102 via the particular port and according to the network information obtained from layer-3 network device 106. Access network device 104 may receive, from the client network device 102 in response to the silent device discovery message, a device discovery reply message. The device discovery reply message may be associated with the physical address of the client network device 102. Access network device 104 may initiate authentication of the client network device 102 using the physical address of the client network device 102 that was received via the device discovery reply message. These and other details are described in greater detail below in relation to the remaining figures.

In certain implementations, layer-3 network device 106 may be considered a primary layer-3 network device 106 from which access network device 104 obtains at least a portion of network information 118. In such an implementation, system 100 also may include a secondary, or backup, layer-3 network device, referred to as layer-3 network device 106'. Layer-3 network device 106' may be connected to a secondary storage device 108', which may store a secondary copy of network information 118, referred to as network information 118'. In certain implementations network information 118' matches network information 118. To illustrate the secondary (backup) nature of layer-3 network device 106', storage device 108', certain communication links 116', and network information 118', those aspects of FIG. 1 are shown using dotted lines.

In certain implementations, access network device may be configured to attempt to obtain at least a portion of network information 118 first from layer-3 network device 106, and if access network device 104 is unable to obtain the at least a portion of network information 118 from layer-3 network device 106, access network device may attempt to obtain the at least a portion of network information 118 (shown as network information 118') from layer-3 network device 106'. At some point, access network device 104 may attempt to reestablish a connection with layer-3 network device 106. The conditions upon which access network device 104 attempts to obtain network information 118' and to reestablish a connection to layer-3 network device 106 may be configurable parameters, as described in greater detail below with reference to FIG. 2.

Continuing with FIG. 1, each of client network devices 102, access network device 104, layer-3 network device 106, and authentication server 110 may include any suitable combination of hardware, firmware, and software, which may cooperate to provide the features of the device. Additionally, where appropriate, each of client network devices 102, access network device 104, layer-3 network device 106, and authentication server 110 may include one or more computer systems at one or more locations. Each computer system may include any appropriate input devices, output devices, mass storage media, processors, memory, or other suitable components for receiving, processing, storing, and communicating data.

Although illustrated and described separately, access network device 104, layer-3 network device 106, storage device 108, and authentication server 110 may be combined or further separated in any suitable manner. For example, these components may be implemented using one or more network devices at one or more geographic locations. In an example in which access network device 104 and layer-3 network device 106 are implemented using a same network device, that network device might store or otherwise have access to network information 118. Accordingly, implementations disclosed herein should not be limited to the configuration of components shown in FIG. 1.

Figure 2:
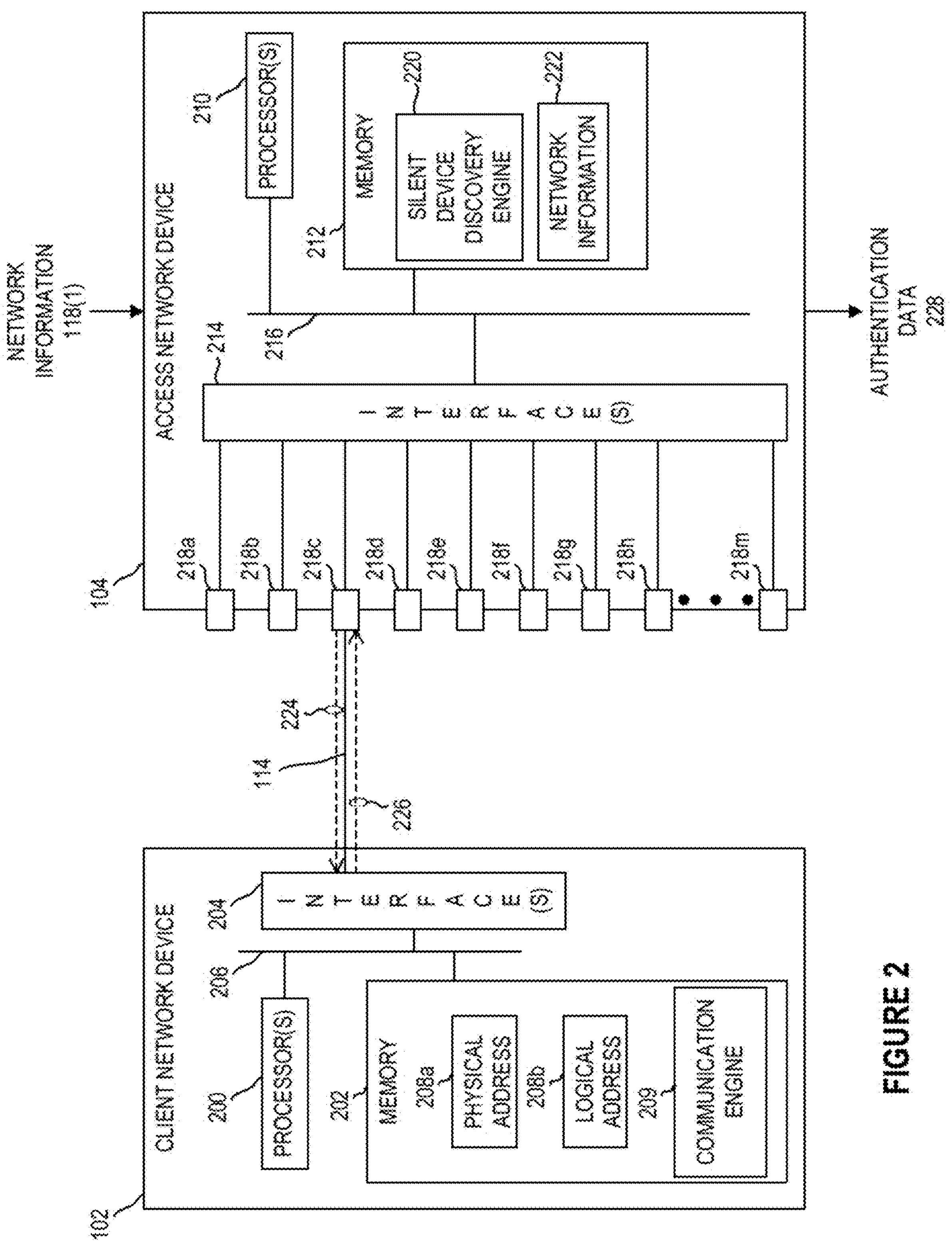
FIG. 2 illustrates additional details of a client network device and an access network device, along with additional details related to operation of the client network device and the access network device, according to certain implementations.

FIG. 2 illustrates additional details of a client network device 102 and access network device 104, along with additional details related to operation of client network device 102 and access network device 104, according to certain implementations. In particular, FIG. 2 illustrates additional details related to operation of access network device 104 to wake a silent network device (e.g., client network device 102) for authentication.

In the illustrated example, client network device 102 includes one or more processors 200, memory 202, and one or more interfaces 204, all of which may communicate using one or more links 206.

Processor 200 may be any component or collection of components adapted to perform computations and/or other processing-related tasks. Processor 200 can be, for example, a microprocessor, a microcontroller, a control circuit, a digital signal processor, a field-programmable gate array (FPGA), an application-specific integrated circuit (ASIC), a system-on-chip (SoC), or combinations thereof. Processor 200 may include one or more processing cores. Processor 200 may include any suitable number of processors, or multiple processors may collectively form a single processor 200.

Memory 202 may include any suitable combination of volatile memory, non-volatile memory, and/or virtualizations thereof. For example memory 202 may include any suitable combination of magnetic media, optical media, RAM, ROM, removable media, and/or any other suitable memory device. Memory 202 may include data structures used to organize and store all or a portion of the stored data. Memory 202 may include a non-transitory computer-readable medium that stores programming for execution by one or more of the one or more processors 200.

Interfaces 204 represent any suitable computer element that can receive information from a communication network/link (e.g., a communication link 114 of FIG. 1) and transmit information through a communication network/link (e.g., a communication link 114 of FIG. 1), or both. Interfaces 204 represent any port or connection, real or virtual, including any suitable combination of hardware, firmware, and software, including protocol conversion and data processing capabilities, to communicate through a LAN, WAN, or other communication system that allows information to be exchanged. Interfaces 204 may facilitate wireless and/or wired communication. As a particular example, one or more of interfaces 204 may be a network interface card (NIC). In certain implementations, at least one of interfaces 204 is configured to communicate through a wired communication link 114 to access network device 104.

Links 206 may include any suitable wired or wireless communication medium for the components of client network device 102 to communicate with one another. For example, links 206 may include any suitable combination of a bus or communication network.

Returning to memory 202, in the illustrated example, memory 202 stores a physical address **208*a* for client network device 102, a logical IP address 208*b* for client network device 102, and a communication engine 209. Physical address 208*a* may be a hardware address of client network device 102. In certain implementations, physical address 208*a* may be a MAC address of client network device 102, which also may be referred to as an Ethernet ID in some implementations. For example, physical address 208*a* may be a MAC address associated with an interface 204 (e.g., a NIC) of client network device 102. Logical address 208*b* may be non-permanent, software-assigned addresses that are assigned to network devices (e.g., client network devices 102) on a network. In certain implementations, logical address 208*b* may be an IP address of client network device 102. For example, logical address 208*b* may be an IP address associated with the interface 204 (e.g., a NIC) of client network device 102. Depending on the protocol version used, the IP address could be an IPv4 address, an IPv6 address, or any other suitable type of IP address. Although a MAC address and an IP address are primarily described for physical address 208*a* and logical address 208*b*, respectively, this disclosure contemplates physical address 208*a* and logical address 208*b*** being any suitable types of physical address and logical address, respectively.

Communication engine 209 generally represents a component of client network device 102 that receives and communicates messages. For example, communication engine 209 could be the component of client network device 102 that receives, via an interface 204, silent device discovery messages transmitted by access network device 104, and communicates a device discovery reply message that includes physical address 208*a* of client network device 102. Although shown to be part of memory 202 of client network device 102, communication engine 209 could be located anywhere on client network device 102. As just one example, communication engine 209 could be part of an interface 204 (e.g., a NIC) of client network device 102.

Turning to access network device 104, in the illustrated example, access network device 104 includes one or more processors 210, memory 212, and one or more interfaces 214, all of which may communicate using one or more links 216. Access network device 104 also may include one or more ports 218*a*-218*m*.

Processor 210 may be any component or collection of components adapted to perform computations and/or other processing-related tasks. Processor 210 can be, for example, a microprocessor, a microcontroller, a control circuit, a digital signal processor, an FPGA, an ASIC, an SoC, or combinations thereof. Processor 210 may include one or more processing cores. Processor 210 may include any suitable number of processors, or multiple processors may collectively form a single processor 210.

Memory 212 may include any suitable combination of volatile memory, non-volatile memory, and/or virtualizations thereof. For example memory 212 may include any suitable combination of magnetic media, optical media, RAM, ROM, removable media, and/or any other suitable memory device. Memory 212 may include data structures used to organize and store all or a portion of the stored data. Memory 212 may include a non-transitory computer-readable medium that stores programming for execution by one or more of the one or more processors 210.

Interfaces 214 represent any suitable computer element that can receive information from a communication network/link (e.g., a communication link 114 of FIG. 1) and transmit information through a communication network/link (e.g., a communication link 114 of FIG. 1), or both. Interfaces 214 represent any port or connection, real or virtual, including any suitable combination of hardware, firmware, and software, including protocol conversion and data processing capabilities, to communicate through a LAN, WAN, or other communication system that allows information to be exchanged. Interfaces 214 may facilitate wireless and/or wired communication. As a particular example, one or more of interfaces 214 may be a NIC. In certain implementations, at least one of interfaces 214 is configured to communicate through a wired communication link 114 to client network device 102.

Links 216 may include any suitable wired or wireless communication medium for the components of access network device 104 to communicate with one another. For example, links 216 may include any suitable combination of a bus or communication network.

Access network device 104 also may include one or more ports 218*a*-218*m*, which may be referred to generally as ports 218 or port 218. One or more of client network devices 102 may be devices (e.g., a wireless access point) that provide network accessibility to other devices. Although FIG. 2 shows access network device 104 to include a particular number of ports 218, access network device 104 may include any suitable number of ports 218, including as few as one port 218. As just a few particular examples, access network device 104 may include 5 ports 218, 12 ports 218, 24 ports 218, 48 ports 218, or 96 ports 218. In certain implementations, some or all of ports 218 may be Ethernet ports, although this disclosure contemplates ports 218 being any suitable type (or combination of types) of ports 218 and/or any other suitable types of ports. To connect to a communication network (e.g., network 112 of FIG. 1), client network devices may be coupled via a wired connection (e.g., communication link 114) to a port 218 of access network device 104.

Returning to memory 212, in the illustrated example, memory 212 stores silent device discovery engine 220 and network information 222. Each of these are described in greater detail below.

Silent device discovery engine 220 may include programming for execution by processor 210, the programming including instructions to perform some or all of the functionality performed by access network device 104 for attempting to waken silent client network device 102. For example, silent device discovery engine 220 may include the logic that allows access network device 104 to perform its associated operations, including attempting to wake a silent client network device 102 that is in an unauthenticated state to cause the silent client network device 102 to provide a physical address of the client network device 102 for use in authenticating the client network device 102 (e.g., via authentication server 110 of FIG. 1) for accessing network 112 (e.g., see FIG. 1). For purposes of this example, it will be assumed that client network device 102 shown in FIG. 2 is a silent network device that initially is in an unauthenticated state.

Network information 222 may include network information obtained by access network device 104 from layer-3 network device 106 (see FIG. 1) and/or network information determined from network information received from layer-3 network device 106. Network information 222 may include information for VLANs that are configured for SDDP, information related to transmission techniques for transmitting silent device discovery messages (e.g., silent device discovery messages 224, described below) to silent client network devices 102, information related to attempts that have been made to contact silent client network devices 102, and/or any other suitable information. In certain implementations, network information 222 may be stored as a JSON dictionary, though this disclosure contemplates network information 222 being stored in any suitable format/data structure.

For example, access network device 104 may receive network information 118(1) from layer-3 network device 106, and may store the received network information 118(1) and/or information determined from network information 118(1) as network information 222 in memory 212. Network information 118(1) may be a portion or all of network information 118. In certain implementations, network information 118(1) may correspond to VLANs that are configured for communication using SDDP, which may be less than all VLANs for which layer-3 network device 106 stores network information 118. Access network device 104 may communicate a request to layer-3 network device 106 for network information 118(1) and/or layer-3 network device 106 may push network information 118(1) to access network device 104 at one or more times. Network information 222 may match network information 118(1) and/or may include network information determined from network information 118(1). An example of network information 222 is described in greater detail below with respect to FIG. 4B.

In operation of an example implementation, access network device 104 (e.g., silent device discovery engine 220) may obtain network information 222 from layer-3 network device 106. For example, access network device 104 may obtain network information 118(1) from layer-3 network device 106 and, based on network information 118(1), store network information 222. Access network device 104 may request network information 118(1) and/or layer-3 network device 106 may push network information 118(1) to access network device 104 at one or more times.

Access network device 104 (e.g., silent device discovery engine 220) may detect a connection to a particular port 218 (e.g., port 218c in the illustrated example) of access network device 104. The connection may be via a communication link 114 and may be associated with client network device 102. The client network device 102 may be a silent network device that is in an unauthenticated state. As a result, access network device 104 might not receive a physical address for the silent client network device 102.

Access network device 104 (e.g., silent device discovery engine 220) may transmit automatically, in response to failure to receive a physical address of client network device 102, a silent device discovery message 224 to client network device 102 via port 218 to which client network device 102 is connected. In certain implementations, silent device discovery message 224 includes an ICMP echo request or an ARP announcement message. In certain implementations, access network device 104 transmits silent device discovery message 224 to client network device 102 according to the obtained network information (e.g., network information 222).

Access network device 104 may transmit silent device discovery message 224 to client network device 102 by transmitting one or more silent device discovery messages 224 each transmitted on an unassigned native VLAN of the multiple VLANs and corresponding to another VLAN of the multiple VLANs. For example, at least in part because client network device 102 is in an unauthenticated state, communicating silent device discovery message 224 to silent client network device 102 on an unassigned native VLAN may allow the silent device discovery message 224 to be communicated via the port (e.g., port 218c in this example) to the silent client network device 102 (e.g., via any of the above-discussed techniques) such that the silent client network device 102 can receive silent device discovery message 224

The native VLAN may be a VLAN designated for carrying untagged traffic. Untagged traffic may include traffic that is not tagged as belonging to a particular VLAN, so the native VLAN tag may be used. The native VLAN could be a default VLAN established by the manufacturer of a network device or assigned in any other suitable manner. In certain implementations, and according to the network information obtained from the Layer-3 network device, access network device 104 may transmit the silent device discovery message 224 to client network device 102 by transmitting multiple silent device discovery messages 224 on an unassigned native VLAN but masquerading as being transmitted on one or more other VLANs on which the silent client network device 102 may reside. In certain implementations, the MAC address of the source of silent device discovery message 224 may appear as the layer-3 gateway for the subnet on which the silent device discovery message 224 is being communicated, as learned by access network device 104 from network information 118(1) (see also FIG. 4B, described below).

As client network device 102 is in an unauthenticated state, access network device 104 may generate a silent device discovery message 224 (e.g., an ICMP echo request) masquerading as a VLAN identified in obtained network information 222. The generated silent device discovery message 224 may be sent on the native VLAN, implying that the silent device discovery message 224 will be sent out of a port 218 (e.g., the port 218 on which client network device 102 is detected) without any VLAN tags (e.g., without any VLAN identifiers) as client network devices 102 generally do not process VLAN tags. The native VLAN on which silent device discovery message 224 is sent may be a designated VLAN, such as VLAN 2000 described in greater detail below as just one example. As described in greater detail below, client network device 102 may respond to silent device discovery message 224 (e.g., the ICMP echo request) with a discovery reply message 226 (e.g., an ICMP echo reply).

In certain implementations, silent device discovery message 224 sent by access network device 104 may include an ARP request proposing to be client network device 102 encouraging client network device 102 to respond (e.g., as device discovery reply 226) stating that client network device 102 owns the particular IP address that is included in the silent device discovery message 224 (e.g., in the ARP request). For example, the ARP request may include a physical address (e.g., a MAC address) of access network device 104, along with a source and destination logical address (IP address) of client network device 102. The ARP request might or might not be a gratuitous ARP request. Additionally, an ARP request might also be referred to as an ARP probe and/or an ARP announcement. Access network device 104 may then receive a response from client network device 102 (e.g., device discovery reply 226, such as an ARP reply), which may include the physical address 208a of client network device 102.

Access network device 104 may transmit the silent device discovery message 224 using one or more different transmission techniques to attempt to wake up the silent client network device 102. As a first example, access network device 104 (e.g., silent device discovery engine 220) may broadcast the silent device discovery message 224 to a subnet associated with client network device 102. As a second example, access network device 104 (e.g., silent device discovery engine 220) may transmit silent device discovery message 224 as a direct silent device discovery message 224 to a subnet associated with client network device 102. As a third example, access network device 104 (e.g., silent device discovery engine 220) may transmit silent device discovery message 224 to a particular range of addresses of a subnet associated with client network device 102. In certain implementations, access network device 104 (e.g., silent device discovery engine 220) may transmit the silent device discovery message 224 using two or more of these techniques to attempt to increase the chances of waking up the silent client network device 102 to cause the silent client network device 102 to send the physical address (e.g., MAC address) of the silent client network device 102 to access network device 104. As described in greater detail below with reference to FIGS. 4A-4B, which VLANs are configured for SDDP and which of these transmission techniques are available for each VLAN, along with how to implement those transmission techniques, if available, may be specified in network information 118/118'/118(1)/222.

Access network device 104 may transmit the silent device discovery message 224 one or multiple times to attempt to wake up the silent client network device 102. In certain implementations, for any one or more of the above transmission techniques for transmitting silent device discovery messages 224, access network device 104 may transmit the silent device discovery message 224 one or multiple times. In certain implementations, access network device 104 may transmit the silent device discovery message 224 to client network device 102, using one or more of the above-described and/or other suitable techniques, until a device discovery reply message 226 (described below) is received from client network device 102 or a termination event occurs. A termination event may include a timeout (e.g., a failure to receive a device discovery reply message 226 within a certain amount of time of an initial transmission of a silent device discovery message 224), a particular number of transmissions of silent device discovery message 224 has been attempted, and/or any other suitable type of termination event.

Although the above-described technique describes using the native VLAN for transmitting silent device discovery messages 224, this disclosure contemplates designating any suitable VLAN as a VLAN on which to transmit silent device discovery messages 224. For example, a particular VLAN, which will be referred to as VLAN 2000 for simplicity, may be created on access network device 104 (e.g., by or using silent device discovery engine 220). In certain implementations, VLAN 2000 might be a VLAN that is not used in network 112 or on an uplink or authenticated port 218 of access network device 104, and that is used as the access VLAN on pre-authenticated ports 218 of access network device 104. In a particular example, VLAN 2000 may be created using the example code of TABLE 1 below. The particular implementation of this code may depend on the particular manufacturer and model of access network device 104.

TABLE 1

```
interface 1/1/11
  no shutdown
  no routing
  vlan access 2000
  port-access onboarding-method concurrent enable
  port-access allow-flood-traffic enable
  aaa authentication port-access dot1x authenticator
    enable
  aaa authentication port-access mac-auth
    enable
```

Continuing with the example in which VLAN 2000 will be used for transmitting silent device discovery messages 224, based on network information 222, access network device 104 may understand that SDDP is active on one or more VLANs at one or more particular subnets. For purposes of this example, it will be assumed that SDDP is active on VLAN 10 and VLAN 20, and that client network devices 102 in VLAN 10 are in the 10.0.10.x/24 subnet, and that client network devices 102 in VLAN 20 are in the 10.10.20.x/24 subnet. One or more sets of silent device discovery messages 224 may be transmitted by access network device 104.

The following TABLES 2-6 include example code that may be executed (e.g., as part of silent device discovery engine 220) to transmit silent device discovery messages 224. This disclosure contemplates the code being implemented using any suitable type of programming language, libraries, and/or other suitable files. Furthermore, it should be understood that the following simply provide examples.

For example, TABLE 2 below includes code for generating one or more silent device discovery messages 224 (e.g., ICMP echo requests) using an unauthenticated port to attempt to wake devices in the 192.168.10.0/24 subnet, using a broadcast message to the .255 address in this example.

TABLE 2

```
interface = ‘eth0’
broadcast_ping=Ether(dst=“ff:ff:ff:ff:ff:ff”,src=‘02:02:02:02:02:02’,type=0x800)/IP(src=
‘10.0.10.2’, dst=‘10.0.10.255’)/ICMP (type=“echo-request”)
sendping(broadcast_ping,iface=interface)
```

For example, TABLE 3 below includes code for generating one or more silent device discovery messages 224 (e.g., ARP Announcements) using an unauthenticated port to attempt to wake a specific device in 10.0.10.22 subnet, using an ARP request in this example.

TABLE 3

```
interface = ‘eth0’
arp=Ether(dst=“ff:ff:ff:ff:ff:ff”,src=aa:bb:cc:dd:ee:ff’,type=0x800)/IP(src=‘10.0.10.22’,
dst=‘10.0.10.22’)/ARP(type=“request”)
sendarp(arp,iface=interface)
```

As another example, TABLE 4 below includes code for generating one or more silent device discovery messages 224 (e.g., ICMP echo requests) to attempt to wake devices on a particular port 218 (e.g., port 1/1/17) of access network device 104 and in subnet 10.0.10.0/24 (e.g., using a broadcast message to the .255 address of VLAN 10 in this example).

TABLE 4

```
broadcast_ping=Ether(dst=“ff:ff:ff:ff:ff:ff”,src=‘02:02:02:02:02:02’,type=0x800)/IP(src=‘
192.168.10.2’, dst=‘192.168.10.255’)/ICMP(type=“echo-request”)
sendping(broadcast_ping,iface=‘m1s1p17’)
```

As another example, TABLE 5 below includes code for generating one or more silent device discovery messages 224 (e.g., ICMP echo requests) to attempt to wake devices on VLAN 2000 if the devices are in subnet 10.0.10.0/24 or 192.168.20.0/255 (e.g., using a broadcast message to the .255 address of VLAN 10 or VLAN 20 in this example).

TABLE 5

```
broadcast_ping=Ether(dst="ff:ff:ff:ff:ff:ff",src='02:02:02:02:02:02',type=0x800)/IP(src='
10.0.10.254', dst='10.0.10.255')/ICMP(type="echo-request")
sendping(broadcast_ping,iface='vlan2000')
broadcast_ping=Ether(dst="ff:ff:ff:ff:ff:ff",src='02:02:02:02:02:02',type=0x800)/IP(src=
10.0.20.254', dst='10.0.20.255')/ICMP(type="echo-request")
sendping(broadcast_ping,iface='vlan2000')
```

As another example, TABLE 6 below includes code for generating one or more silent device discovery messages 224 (e.g., ICMP echo requests) to attempt to wake devices on VLAN 2000 if the devices are in subnet 10.0.10.0/24 or 10.0.20.0/24 (e.g., using a broadcast message to the .255 address of VLAN 10 or VLAN 20 in this example).

TABLE 6

```
broadcast_ping=Ether(dst="ff:ff:ff:ff:ff:ff",src='02:02:02:02:02:02',type=0x800)/IP(src=
'10.0.10.1', dst='192.168.10.255')/ICMP(type="echo-request")
sendp(broadcast_ping,iface='m1s1p11')
sendp(broadcast_ping,iface='m1s1p13')
sendp(broadcast_ping,iface='m1s1p15')
sendp(broadcast_ping,iface='m1s1p17')
broadcast_ping=Ether(dst="ff:ff:ff:ff:ff:ff",src='02:02:02:02:02:02',type=0x800)/IP(src=
'10.0.20.254', dst='10.0.20.255')/ICMP(type="echo-request")
sendp(broadcast_ping,iface='m1s1p11')
sendp(broadcast_ping,iface='m1s1p13')
sendp(broadcast_ping,iface='m1s1p15')
sendp(broadcast_ping,iface='m1s1p17')
```

The following describes example contents of silent device discovery message 224 and device discovery reply message 226. Examples are described for each type of transmission technique (e.g., broadcast ping, direct ping, ping range, and gratuitous ARP). It should be understood that the following is just an example and this disclosure contemplates silent device discovery message 224 and device discovery reply message 226 including any suitable content and having any suitable format. Additional details of silent device discovery message 224 and device discovery reply message 226 are described in relation to FIGS. 4A and 4B.

In certain implementations, for the broadcast ping technique, silent device discovery message 224 (e.g., an ICMP echo request) may include a source MAC address of layer-3 network device 106, a destination MAC address (e.g., a broadcast MAC address), a source IP address of layer-3 network device 106, and a destination IP address (e.g., a broadcast IP address). In certain implementations, for the broadcast ping technique, device discovery reply message 226 (e.g., an ICMP echo reply) may include a source MAC address (or other physical address 208*a*) of client network device 102, a destination MAC address of layer-3 network device 106, a source IP address (or other logical address 208*b*) of client network device 102, and a destination IP address of layer-3 network device 106.

In certain implementations, for the direct ping technique, silent device discovery message 224 (e.g., an ICMP echo request) may include a source MAC address of layer-3 network device 106, a destination MAC address (e.g., a broadcast MAC address), a source IP address of layer-3 network device 106, and a destination IP address of client network device 102. In certain implementations, for the direct ping technique, device discovery reply message 226 (e.g., an ICMP echo reply) may include a source MAC address (or other physical address 208*a*) of client network device 102, a destination MAC address of layer-3 network device 106, a source IP address (or other logical address 208*b*) of client network device 102, and a destination IP address of layer-3 network device 106.

In certain implementations, for the ping range technique, each silent device discovery message 224 (e.g., each ICMP echo request) sent for the ping range may include a source MAC address of layer-3 network device 106, a destination MAC address (e.g., a broadcast MAC address), a source IP address of layer-3 network device 106, and a destination IP address (e.g., an IP address within the IP address range being pinged, such as IP address A through IP address N). In certain implementations, for the ping range technique, device discovery reply message 226 (e.g., an ICMP echo reply) may include a source MAC address (or other physical address 208*a*) of client network device 102, a destination MAC address of layer-3 network device 106, a source IP address (or other logical address 208*b*) of client network device 102, and a destination IP address of layer-3 network device 106.

In certain implementations, for the gratuitous ARP technique, silent device discovery message 224 (e.g., an ARP Announcement) may include a source MAC address of layer-3 network device 106, a destination MAC address (e.g., a broadcast MAC address), a source IP address of client network device 102, and a destination IP address of client network device 102. In certain implementations, for the gratuitous ARP technique, device discovery reply message 226 (e.g., an ARP Reply) may include a source MAC address (or other physical address 208*a*) of client network device 102, a destination MAC address of layer-3 network device 106, a source IP address (or other logical address 208*b*) of client network device 102, and a destination IP address (or other logical address 208*b*) of client network device 102.

Whether the native VLAN technique, the defined designated VLAN technique (e.g., designating VLAN 2000 in the above example), or another suitable technique is used for designating a suitable VLAN for transmitting silent device discovery messages 224, in response to the silent device discovery message 224, access network device 104 (e.g., silent device discovery engine 220) may receive from client network device 102 a device discovery reply message 226. Device discovery reply message 226 may be associated with the physical address 208*a* of client network device 102. For example, device discovery reply message 226 may include the physical address 208*a* of client network device 102. In certain implementations, the physical address of the client network device 102 is a MAC address. In certain implementations, device discovery reply message 226 is an ICMP echo reply message or an ARP reply message.

Access network device 104 (e.g., silent device discovery engine 220) may initiate authentication of the client network device 102 using the physical address 208*a* of the client network device 102 that was received via the device discovery reply message 226. This disclosure contemplates access network device 104 initiating authentication of client network device 102 using the obtained physical address 208*a* of the client network device 102 in any suitable manner. In certain implementations, access network device 104 may transmit authentication data 228 to authentication server 110 to cause authentication server 110 to attempt to authenticate the client network device 102. Authentication data 228 may be transmitted as an authentication request, such as a RADIUS request. Authentication data 228 may include authentication credentials of client network device 102, which may include the physical address 208*a* of the client network device 102. In certain implementations, access network device 104 may transmit the authentication data 228 to authentication server 110 directly. In certain implementations, access network device 104 may transmit the authentication data 228 to layer-3 network device 106, and layer-3 network device 106 may work with authentication server 110 to attempt to authenticate client network device 102.

In certain implementations, access network device 104 (e.g., silent device discovery engine 220) may be configured with one or more commands to configure access network device 104 for operation with the SDDP. It should be understood that the following commands are provided for example purposes only.

TABLE 7 below lists global commands for configuring access network device 104. As shown in TABLE 7, the global commands for access network device 104 may include silent-device-discovery-protocol client primary <host> x.x.x.x <password>yyyy; silent-device-discovery-protocol client secondary <host> x.x.x.x <password >yyyy; silent-device-discovery-protocol client update-interval-secs <60-3600>; silent-device-discovery-protocol client server-timeout-secs <5-60>; silent-device-discovery-protocol client server-primary-retry-interval-secs <60-3600>; port-access allow-silent-device-discovery-protocol-ping interval-secs <1-60>; and silent-device-discovery-protocol client enable.

The global command silent-device-discovery-protocol client primary <host> x.x.x.x <password>yyyy may identify, and provide a username and password for, a primary layer-3 network device 106 for attempting, by access network device 104, to obtain network information 118(1). The global command silent-device-discovery-protocol client secondary <host> x.x.x.x <password>yyyy may identify, and provide a username and password for, a secondary (e.g., backup) layer-3 network device 106' for attempting, by access network device 104, to obtain network information 118(1) (from network information 118') if attempts to obtain network information 118(1) from the primary layer-3 network device 106 fail. The global command silent-device-discovery-protocol client update-interval-secs <60-3600> may indicate a frequency at which access network device 104 will attempt to obtain network information 118(1) from a layer-3 network device 106/106' (primary or secondary). The global command silent-device-discovery-protocol client server-timeout-secs <5-60> may identify a time access network device 104 should wait before switching from the primary layer-3 network device 106 to the secondary layer-3 network device 106' if attempts to obtain network information 118(1) from primary layer-3 network device 106 fail. The global command silent-device-discovery-protocol client server-primary-retry-interval-secs <60-3600> may identify a time period access network device 104 should wait before attempting to determine whether the primary layer-3 network device 106 is back online.

The global command port-access allow-silent-device-discovery-protocol-ping interval-secs <1-60> may indicate a frequency with which access network device 104 is to send silent device discovery messages 224. The global command silent-device-discovery-protocol client enable may activate the SDDP for the access network device 104, configuring the access network device 104 to operate as a client in a client-server model between access network device 104 and layer-3 network device 106.

TABLE 7

| Access Network Device (e.g., Access Switch) Configuration - Global Commands |
|---|
| silent-device-discovery-protocol client primary <host> x.x.x.x <password>yyyy |
| silent-device-discovery-protocol client secondary < host> x.x.x.x < password >yyyy |
| silent-device-discovery-protocol client update-interval-secs <60-3600> |
| silent-device-discovery-protocol client server-timeout-secs < 5-60> |
| silent-device-discovery-protocol client server-primary-retry-interval-secs < 60-3600> |
| port-access allow-silent-device-discovery-protocol-ping interval-secs < 1-60> |
| silent-device-discovery-protocol client enable |

TABLE 8 below lists switch port interface commands for configuring access network device 104. The switch port interface commands may be used to activate and otherwise configure one or more ports 218 of access network device 104 for SDDP. The one or more ports 218 may be configured individually or in ranges (e.g., conf t, interface 1/1/1-1/1/48 for a 48 port switch). As shown in TABLE 8, the switch port interface commands for access network device 104 may include port-access allow-silent-device-discovery-protocol-broadcast-ping enable; port-access allow-silent-device-discovery-protocol-direct-ping enable; port-access allow-silent-device-discovery-protocol-arp enable; port-access allow-silent-device-discovery-protocol-range-ping enable; port-access allow-silent-device-discovery-protocol multiple-client-devices; and port-access allow-silent-device-discovery-protocol-ping interval-secs <1-60>.

The switch port interface command port-access allow-silent-device-discovery-protocol-broadcast-ping enable may be used to activate for one or more ports 218 the broadcast transmission technique for transmitting silent device discovery messages 224. The switch port interface command port-access allow-silent-device-discovery-protocol-direct-ping enable may be used to activate for one or more ports 218 the direct transmission technique for transmitting silent device discovery messages 224 to a particular client network device 102. The switch port interface command port-access allow-silent-device-discovery-protocol-range-ping enable may be used to activate for one or more ports the range ping transmission technique for transmitting silent device discovery messages 224 to a range of IP addresses of a particular VLAN. The switch port interface command port-access allow-silent-device-discovery-protocol multiple-client-devices may be used to activate for one or more ports a multiple-client-devices transmission technique for transmitting silent device discovery messages 224 to multiple client network devices 102 on a single port 218. The switch port interface command port-access allow-silent-device-discovery-protocol-ping interval-secs <1-60> may define interval between attempts by access network device 104 to transmit silent device discovery messages 224 indicate. This switch port interface command may allow overriding of the global configuration, if appropriate.

TABLE 8

| Access Network Device (e.g., Access Switch) Configuration - Switch Port Interface Commands |
|---|
| port-access allow-silent-device-discovery-protocol-broadcast-ping enable |
| port-access allow-silent-device-discovery-protocol-direct-ping enable |
| port-access allow-silent-device-discovery-protocol-arp enable |
| port-access allow-silent-device-discovery-protocol-range-ping enable |
| port-access allow-silent-device-discovery-protocol multiple-client-devices |
| port-access allow-silent-device-discovery-protocol-ping interval-secs < 1-60> |

Figure 3:
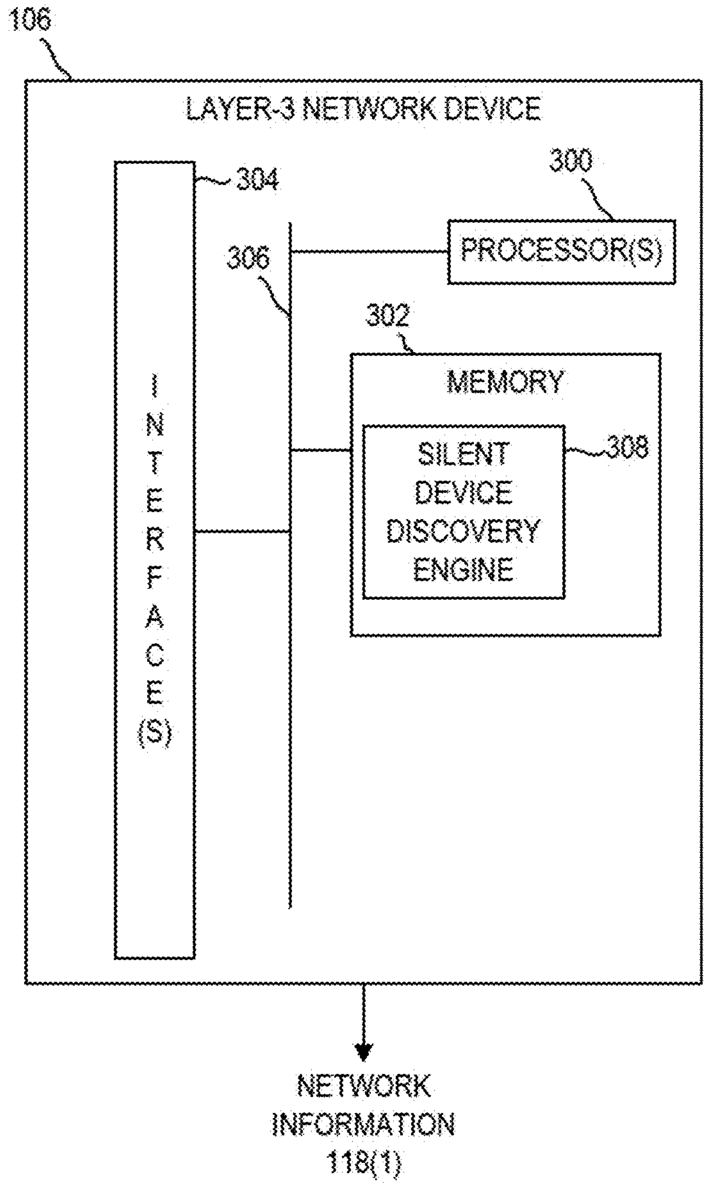
FIG. 3 illustrates additional details of a layer-3 network device, according to certain implementations.

FIG. 3 illustrates additional details of an example layer-3 network device 106, according to certain implementations. Layer-3 network device 106 could be a primary layer-3 network device 106 for access network device 104 (of FIGS. 1 and 2) or a second layer-3 network device 106' for access network device 104. In the illustrated example, client network device 102 includes one or more processors 200, memory 202, and one or more interfaces 204, all of which may communicate using one or more links 206.

Processor 300 may be any component or collection of components adapted to perform computations and/or other processing-related tasks. Processor 300 can be, for example, a microprocessor, a microcontroller, a control circuit, a digital signal processor, an FPGA, an ASIC, an SoC, or combinations thereof. Processor 300 may include one or more processing cores. Processor 300 may include any suitable number of processors, or multiple processors may collectively form a single processor 300.

Memory 302 may include any suitable combination of volatile memory, non-volatile memory, and/or virtualizations thereof. For example memory 302 may include any suitable combination of magnetic media, optical media, RAM, ROM, removable media, and/or any other suitable memory device. Memory 302 may include data structures used to organize and store all or a portion of the stored data. Memory 302 may include a non-transitory computer-readable medium that stores programming for execution by one or more of the one or more processors 300.

Interfaces 304 represent any suitable computer element that can receive information from a communication network/link (e.g., a communication link 116 of FIG. 1) and transmit information through a communication network/link (e.g., a communication link 116 of FIG. 1), or both. Interfaces 304 represent any port or connection, real or virtual, including any suitable combination of hardware, firmware, and software, including protocol conversion and data processing capabilities, to communicate through a LAN, WAN, or other communication system that allows information to be exchanged. Interfaces 304 may facilitate wireless and/or wired communication. As a particular example, one or more of interfaces 304 may be a NIC. In certain implementations, at least one of interfaces 204 is configured to communicate through a communication link 116 to access network device 104.

Links 306 may include any suitable wired or wireless communication medium for the components of layer-3 network device 106 to communicate with one another. For example, links 306 may include any suitable combination of a bus or communication network.

Links 216 may include any suitable wired or wireless communication medium for the components of access network device 104 to communicate with one another. For example, links 216 may include any suitable combination of a bus or communication network.

Returning to memory 302, in the illustrated example, memory 302 stores silent device discovery engine 308. Silent device discovery engine 308 may include programming for execution by processor 300, the programming including instructions to perform some or all of the functionality performed by layer-3 network device 106 in connection with assisting access network device 104 in attempting to waken silent client network device 102. For example, silent device discovery engine 220 may include the logic that allows layer-3 network device 106 to be configured for SDDP, for configuring VLANs to be configured for SDDP, to define transmission techniques for access network device 104 to transmit silent device discovery messages 224 to silent client network devices 102, and to provide network information 118(1) to access network device 104. In certain implementations, the operations associated with SDDP for layer-3 network device 106 may operate in transmission control protocol (TCP) mode. In certain implementations, for operations associated with SDDP, layer-3 network device 106 may communicate with access network device 104 on a local port of layer-3 network device 106 that may be protected by authentication, which may be made available to access network device 104, as described above with reference to TABLE 7 in FIG. 2, for both a primary layer-3 network device 106 and a secondary layer-3 network device 106'.

Continuing with FIG. 3, in operation of an example implementation, layer-3 network device 106 (e.g., silent device discovery engine 308) may receive configuration information for configuring one or more VLANs to operate using SDDP. Furthermore, for those VLANs that are configured for operation using SDDP, layer-3 network device 106 (e.g., silent device discovery engine 308) may receive configuration information for configuring one or more transmission techniques for access network device 104 to attempt to waken silent client network devices 102 using silent device discovery messages 224. For example, for those VLANs that are configured for operation using SDDP, layer-3 network device 106 (e.g., silent device discovery engine 308) may receive configuration information for configuring one or more of a broadcast transmission technique, a direct ping technique, a range ping technique, a multiple client device discovery technique (e.g., for discovering multiple client network devices 102 on a single port 218), and/or any other suitable transmission techniques. Layer-3 network device 106 may store this configuration information as part of network information 118, such as in storage device 108 of FIG. 1.

In operation of an example implementation, layer-3 network device 106 (e.g., silent device discovery engine 308) may transmit network information 118(1) to access network device 104. As examples, layer-3 network device 106 may transmit network information 118(1) to access network device 104 in response to a request from access network device 104 for network information 118(1) and/or layer-3 network device 106 may push network information 118(1) to access network device 104 at one or more times (e.g., on a schedule at one or more predetermined times, as network information 118 is updated, or at any other suitable time(s)). In certain implementations, whether in response to a request for network information 118(1) from access network device 104 or on its own, layer-3 network device 106 may access network information 118, determine which VLANs are configured for SDDP, and transmit the portion of network information 118 that corresponds to those VLANs that are configured for SDDP (e.g., as some or all of network information 118(1)). Of course, this disclosure contemplates layer-3 network device 106 simply transmitting all, or any portion, of network information 118 (as some or all of network information 118(1)) to access network device 104.

In certain implementations, layer-3 network device 106 (e.g., silent device discovery engine 308) may be configured with one or more commands to configure layer-3 network device 106 for operation with the SDDP. It should be understood that the following commands are provided for example purposes only.

TABLE 9 below lists global commands for configuring layer-3 network device 106. As shown in TABLE 9, the global commands for layer-3 network device 106 may include silent-device-discovery-protocol <server/local> and silent-device-discovery-protocol server username password.

The global command silent-device-discovery-protocol <server/local> may activate the SDDP for the layer-3 network device 106. The global command silent-device-discovery-protocol server username password may indicate the username and password for modifying aspects of layer-3 network device 106 related to SDDP operation.

TABLE 9

| Layer-3 network device (e.g., Core Switch) Configuration - Global Commands |
| --- |
| silent-device-discovery-protocol <server/local> |
| silent-device-discovery-protocol server username password |

TABLE 10 below lists VLAN interface commands for configuring layer-3 network device 106. The VLAN interface commands may be used to activate and otherwise configure the one or more VLANs for SDDP. This information may be captured as part of network information 118. As shown in TABLE 10, the VLAN interface commands for layer-3 network device 106 may include silent-device-discovery-protocol advertise-broadcast-enable; silent-device-discovery-protocol direct-ping <IP-Address> <Optional: Destination-MAC-Address>; and silent-device-discovery-protocol range-ping <start-IP-Address> <end-IP-Address>.

The VLAN interface command silent-device-discovery-protocol advertise-broadcast-enable may be used to activate for a particular VLAN the broadcast transmission technique for transmitting silent device discovery messages 224 for the particular VLAN. The VLAN interface command silent-device-discovery-protocol direct-ping <IP-Address> <Optional: Destination-MAC-Address> may be used to activate for a particular client network device 102 on a particular VLAN the direct transmission technique for transmitting silent device discovery messages 224 to the particular client network device 102, along with the associated IP address (and possibly MAC address) information. The VLAN interface command silent-device-discovery-protocol range-ping <start-IP-Address> <end-IP-Address> may be used to activate for a particular VLAN the range ping transmission technique for transmitting silent device discovery messages 224 to a range of IP addresses of the particular VLAN, along with the start and end IP addresses for the range ping.

TABLE 10

| Layer-3 network device (e.g., Core Switch) Configuration - VLAN Interface Commands |
| --- |
| silent-device-discovery-protocol advertise-broadcast-enable |
| silent-device-discovery-protocol direct-ping <IP-Address> <Optional:Destination-MAC-Address> |
| silent-device-discovery-protocol range-ping <start-IP-Address> <end-IP-Address> |

FIGS. 4A-4B illustrate examples of network information, according to certain implementations. In particular, FIG. 4A illustrates an example of network information 118 (see FIG. 1) stored by layer-3 network device 106, and FIG. 4B illustrates an example of network information 222 (see FIG. 2) obtained by access network device 104. It should be understood that although FIGS. 4A-4B use IPv4-formatted IP addresses, this is for example, purposes only. This disclosure may operate with IPv4, IPv6, and potentially any other suitable IP addressing format.

Turning to FIG. 4A, FIG. 4A illustrates network information table 400, which may include and/or may be part of network information 118 (see FIG. 1). In the illustrated example, network information table 400 includes multiple columns 402_a_-402_g_ (referred to generally as columns 402) and multiple rows 404_a_-404_c_ (referred to generally as rows 404). Columns 402 correspond to particular types of information, and rows 404 correspond to particular VLANs, providing the particular types of information of columns 402 for each VLAN. In particular, network information table 400 includes rows 404_a_, 404_b_, and 404_c_, which corresponds to example VLANS 10, 20, and 30, respectively. Some or all of the network information 118 shown in network information table 400 may be controlled using the layer-3 network device VLAN interface commands described above with reference to FIG. 3.

Columns 402_a_, 402_b_, 402_c_, 402_d_, 402_e_, 402_f_, and 402_g_ correspond to VLAN ID, IP/Mask, Broadcast, Directed Ping with/without MAC, Ping Range, Source MAC, and SDDP indicator, respectively. Each of these are described in greater detail below.

For example, VLAN ID may indicate an identifier for one or more VLANs configured within system 100 of FIG. 1. The VLAN identifiers may have any suitable format. In the illustrated example, the VLAN IDs are 10, 20, and 30. As just one particular example, each VLAN could be a network that corresponds to different groups within a company (e.g., the IT group, the Marketing group, and the Finance group).

As another example, IP/Mask may indicate IP address and/or subnet mask information for each identified VLAN. In the illustrated example, the IP address/subnet mask for VLAN 10 is 10.0.10.1/24, the IP address/subnet mask for VLAN 20 is 10.0.20.1/24, and the IP address/subnet mask for VLAN 30 is 10.0.30.1/24.

As another example, the next three columns (Broadcast, Directed Ping, and Range) may indicate information for different techniques for transmitting device discovery requests to silent client network devices 102, including whether or not the technique is available/active and, if so, address information for transmitting the device discovery requests. Each of these columns now will be described.

The Broadcast column may provide an address for transmitting a broadcast message (e.g., for transmitting a device discovery message as a broadcast message) on the particular VLAN. In the illustrated example, the broadcast address for VLAN 10 is 10.0.10.255, the broadcast address for VLAN 20 is 10.0.20.255, and the broadcast address for VLAN 30 is 10.0.30.255. Taking VLAN 10 as an example, the address range at which client network devices 102 of VLAN 10 may be located may be referred to as the host range, and in the example of VLAN 10, the host range may be 10.0.10.1 through 10.0.10.254. In certain implementations, a broadcast message transmitted (broadcast) using address 10.0.10.255 potentially may be received by any client network device 102 in address range 10.0.10.1 through 10.0.10.254. The broadcast ping technique may provide a way to attempt to wake up a silent client network device 102 to obtain the physical address 208*a* for the silent client network device 102 even if the IP address for the silent client network device 102 is unknown.

The Directed Ping with/without MAC column may provide an IP address and may also include a destination MAC address or a broadcast MAC address for transmitting a message directly to a particular client network device 102 (e.g., for transmitting a silent device discovery message 224 as a direct message to a particular client network device 102) on the particular VLAN. In the illustrated example, directed pings and ARP requests are possible on VLAN 10 for address 10.0.10.22 and directed pings for 10.0.10.33, directed pings are inactive (possible, but no directed ping addresses known) for VLAN 20, and directed pings are unavailable for VLAN 30. The directed ping options presupposes that the IP address and maybe the destination MAC address of the client network device 102 is known ahead of time (e.g., prior to attempting to wake the client network device 102), as that IP address is used by access network device 104 to send the direct silent device discover message to the client network device 102. In certain implementations, if the directed ping does not contain a destination MAC address (e.g., per column 402*d*), the directed ping may be sent with the broadcast address as per column 402*c*. The IP address for the client network device 102 may be defined in the configuration template.

The Range column may provide a range of address (e.g., IP address) for transmitting a message to each address (e.g., for transmitting a silent device discovery message 224 to each address) in the range of addresses. The range of addresses may be each address in the host range for a particular VLAN or may be a subset of the address in the host range for the particular VLAN. The ping range technique also may be referred to as a ping sweep technique. In the illustrated example, pings are possible on VLAN 10 for address in the range 10.0.10.15 through 10.0.10.20. Ping ranges are not defined for VLANs 20 and 30 in this example. The ping range technique may provide another way to attempt to wake up a silent client network device 102 to obtain the physical address 208*a* for the silent client network device even if the IP address for the silent client network device is unknown, as certain client network devices 102 might not respond to a broadcast ping (e.g., to a silent device discovery message 224 sent using the broadcast technique).

The Source MAC column may identify a physical address 208*a* (e.g., a MAC address) of layer-3 network device 106. In the illustrated example, the source MAC address is represented using the placeholder 6-byte address aa:bb:cc:dd:ee:ff.

The SDDP column may indicate, for each VLAN, whether the VLAN is configured to communicate using the SDDP. In other words, the SDDP column may indicate whether the VLAN is configured for waking silent client network devices 102 according to certain implementations of this disclosure. In the illustrated example, VLAN 10 and VLAN 30 are configured for communication using SDDP (e.g., see entry "YES"), while VLAN 20 is not configured for communication using SDDP (e.g., see entry "NO").

Some or all of the network information 118 shown in network information table 400 may be controlled using the layer-3 network device VLAN interface commands described above with reference to FIG. 3. For example, the various VLAN interface commands may be used to activate SDDP for particular VLANS and/or to activate particular transmission techniques (and specify associated transmission information) for transmitting silent device discovery messages 224.

Turning to FIG. 4B, FIG. 4B illustrates network information table 406, which may include and/or may be part of network information 222 (see FIG. 2). In the illustrated example, network information table 406 includes multiple columns 408*a*-408*g* (referred to generally as columns 408) and multiple rows 410*a*-410*d* (referred to generally as rows 410). Access network device 104 may obtain at least a portion of the information of network information table 406 from layer-3 network device 106.

Columns 408 correspond to particular types of information. Columns 408*a*, 408*b*, 408*c*, 408*d*, 408*e*, 408*f*, and 408*g* correspond to Attempt, Source MAC, Destination MAC, Source IP, Destination IP, Broadcast, and Type, respectively. Each of these are described in greater detail below.

For example, an attempt may identify particular attempts by access network device 104 to waken one or more silent client network devices 102 by transmitting one or more silent device discovery requests to attempt to wake up a silent client network device 102 to cause the silent client network device 102 to transmit the physical address 208*a* of the silent client network device 102 to access network device 104. Potentially depending on the transmission technique used (described below for column 408*g*), the attempt may stand alone or be grouped with one or more other attempts.

As another example, the Source MAC column may identify a physical address 208*a* (e.g., a MAC address) of layer-3 network device 106. In the illustrated example, the source MAC address is represented using the placeholder 6-byte address aa:bb:cc:dd:ee:ff.

As another example, the Destination MAC column may identify a physical address 208*a* (e.g., a MAC address) of the port 218 (e.g., port 218*c*) of access network device 104 via which access network device 104 may transmit the silent device discovery request. In the illustrated example, the source MAC address is represented using the placeholder 6-byte address ff:ff:ff:ff:ff:ff if it is a broadcast address or a specific MAC address if added within 402*b*. As another example, the Source IP column may identify the IP address of layer-3 network device 106. As another example, the Destination IP column may identify the IP address of the port 218 (e.g., port 218*c*) of access network device 104 via which access network device 104 may transmit the silent device discovery request.

The Broadcast column may identify that broadcast IP address that may be used to transmit the silent device discovery request in a broadcast manner to attempt to wake up a silent client network device 102 to cause the silent client network device 102 to transmit the physical address 208*a* of the silent client network device 102 to access network device 104. As with other information shown in table 406, The broadcast IP address may be learned by access network device 104 from the portion of network information 118 transmitted layer-3 network device 106 (network information 118(1)) and stored by access network device 104 as network information 222. The broadcast IP address might or might not be used for any given transmission, depending on the transmission technique used for that attempt (e.g., according to the Type column, described below, with attempts 3 and 11 being of type broadcast and using the identified broadcast IP address shown in the Broadcast column).

The Type column may indicate which transmission technique is used by access network device 104 to transmit the silent device discovery request to attempt to wake up a silent client network device 102 to cause the silent client network device 102 to transmit the physical address 208*a* of the silent client network device 102 to access network device 104. In certain implementations, the type, or transmission technique, may be a broadcast ping, a direct ping, a ping range, and/or a gratuitous ARP.

Rows 410 of network information table 406 correspond to particular attempts to waken one or more silent client network devices 102. In this example, rows 410*a*, 410*b*, 410*c*, 410*d*, and 410*e* correspond to attempts 1, 2, 3, 4-10, and 11, respectively. Each attempt is described in greater detail below.

For attempt 1 (row 410*a*), based at least in part on network information 118 included in row 404*a* of network information table 400 (see indication of directed ping IP address 10.0.10.22 with destination MAC address aa: aa: aa: aa: aa: aa), access network device 104 may transmit a silent device discovery message 224 on native VLAN masquerading as VLAN 10, using a direct ping to IP address 10.0.10.22 and destination MAC address aa: aa: aa: aa: aa: aa in this example. For attempt 2 (row 410*b*), based at least in part on network information 118 included in row 404*a* 404*b* of network information table 400 (see indication of directed ping IP address 10.0.10.33), access network device 104 may transmit a silent device discovery message 224 on native VLAN masquerading as VLAN 10, using a direct ping to IP address 10.0.10.33 along with destination mac broadcast address ff:ff:ff:ff:ff:ff.

For attempt 3 (row 410*c*), based at least in part on network information 118 included in row 404*a* of network information table 400 (see indication of broadcast ping IP address 10.0.10.255), access network device 104 may transmit a silent device discovery message 224 on native VLAN masquerading as VLAN 10, using a broadcast ping to IP address 10.0.10.255. For attempts 4 through 10 (row 410*d*), based at least in part on network information 118 included in row 404*a* of network information table 400 (see indication of ping range addresses 10.0.10.15 through 10.0.10.20), access network device 104 may transmit a silent device discovery message 224 on native VLAN masquerading as VLAN 10, using pings to IP addresses of IP address range 10.0.10.15 through 10.0.10.20. For attempt 11 (row 410*e*), based at least in part on network information 118 included in row 404*c* of network information table 400 (see indication of broadcast ping IP address 10.0.30.255), access network device 104 may transmit a silent device discovery message 224 on native VLAN masquerading as VLAN 30, using a broadcast ping to IP address 10.0.30.255.

Although FIGS. 4A and 4B shown network information 118 and network information 222 being stored in table format (e.g., in network information table 400 and network information table 406, respectively), network information 118 and network information 222 may be stored in any suitable format. In certain implementations, network information 118 and network information 222 may be stored as a JSON dictionary, though this disclosure contemplates network information 118 and network information 222 being stored in any suitable format/data structure.

Having described example contents of network information 118 and network information 222, the following describes additional details of the example contents of silent device discovery message 224 and device discovery reply message 226 described previously with reference to FIG. 2. Examples are described for each type of transmission technique (e.g., broadcast ping, direct ping, ping range, and gratuitous ARP). Again, it should be understood that the following is just an example and this disclosure contemplates silent device discovery message 224 and device discovery reply message 226 including any suitable content and having any suitable format.

In certain implementations, for the broadcast ping technique, silent device discovery message 224 (e.g., an ICMP echo request) may include a source MAC address of layer-3 network device 106 (e.g., column 402*f* of FIG. 4A/column 408*b* of FIG. 4B), a destination MAC address (e.g., MAC address ff:ff:ff:ff:ff:ff, which may indicate a broadcast message at the physical layer), a source IP address of layer-3 network device 106 (e.g., column 402*b* of FIG. 4A/column 408*d* of FIG. 4B), and a destination IP address (e.g., a broadcast IP address, such as shown in column 402*c* of FIG. 4A and column 408*e*, rows 410*c* and 410*e* (according to the broadcast IP address specified in column 402*f*) of FIG. 4B). In certain implementations, for the broadcast ping technique, device discovery reply message 226 (e.g., an ICMP echo reply) may include a source MAC address (or other physical address 208*a*) of client network device 102, a destination MAC address of layer-3 network device 106 (e.g., column 402*f* of FIG. 4A/column 408*b* of FIG. 4B), a source IP address (or other logical address 208*b*) of client network device 102, and a destination IP address of layer-3 network device 106 (e.g., column 402*b* of FIG. 4A/column 408*d* of FIG. 4B).

In certain implementations, for the direct ping technique, silent device discovery message 224 (e.g., an ICMP echo request) may include a source MAC address of layer-3 network device 106 (e.g., column 402*f* of FIG. 4A/column 408*b* of FIG. 4B), a destination MAC address (e.g., MAC address ff:ff:ff:ff:ff:ff, which may indicate a broadcast message at the physical layer, or column 402*d* of FIG. 4A/column 408*c* of FIG. 4B, if available), a source IP address of layer-3 network device 106 (e.g., column 402*b* of FIG. 4A/column 408*d* of FIG. 4B), and a destination IP address of client network device 102 (e.g., a destination IP address, such as shown in column 402*d* of FIG. 4A/column 408*e* of FIG. 4B). In certain implementations, for the direct ping technique, device discovery reply message 226 (e.g., an ICMP echo reply) may include a source MAC address (or other physical address 208*a*) of client network device 102, a destination MAC address of layer-3 network device 106 (e.g., column 402*f* of FIG. 4A/column 408*b* of FIG. 4B), a source IP address (or other logical address 208*b*) of client network device 102, and a destination IP address of layer-3 network device 106 (e.g., column 402*b* of FIG. 4A/column 408*d* of FIG. 4B).

In certain implementations, for the ping range technique, each silent device discovery message 224 (e.g., each ICMP echo request) sent for the ping range may include a source MAC address of layer-3 network device 106 (e.g., column 402*f* of FIG. 4A/column 408*b* of FIG. 4B), a destination MAC address (e.g., MAC address ff:ff:ff:ff:ff:ff, which may indicate a broadcast message at the physical layer), a source IP address of layer-3 network device 106 (e.g., column 402*b* of FIG. 4A/column 408*d* of FIG. 4B), and a destination IP address (e.g., an IP address within the IP address range being pinged, such as IP address A through IP address N) (e.g., a IP address of the ping range, such as shown in column 402*e* of FIG. 4A and reflected in column 408*e* of FIG. 4B, such as shown for row 410*d*, attempts 4-10, with destination IP range 10.0.10.15 through 10.0.10.20). In certain implementations, for the ping range technique, device discovery reply message 226 (e.g., an ICMP echo reply) may include a source MAC address (or other physical address 208*a*) of client network device 102, a destination MAC address of layer-3 network device 106 (e.g., column 402*f* of FIG. 4A/column 408*b* of FIG. 4B), a source IP address (or other logical address 208*b*) of client network device 102, and a destination IP address of layer-3 network device 106 (e.g., column 402*b* of FIG. 4A/column 408*d* of FIG. 4B).

In certain implementations, for the gratuitous ARP technique, silent device discovery message 224 (e.g., an ARP Announcement) may include a source MAC address of layer-3 network device 106 (e.g., column 402*f* of FIG. 4A/column 408*b* of FIG. 4B), a destination MAC address (e.g., MAC address ff:ff:ff:ff:ff:ff, which may indicate a broadcast message at the physical layer), a source IP address of client network device 102 (e.g., column 402*d* of FIG. 4A/column 408*e* of FIG. 4B), and a destination IP address of client network device 102 (e.g., column 402*d* of FIG. 4A/column 408*e* of FIG. 4B). In certain implementations, for the gratuitous ARP technique, device discovery reply message 226 (e.g., an ARP Reply) may include a source MAC address (or other physical address 208*a*) of client network device 102, a destination MAC address of layer-3 network device 106 (e.g., column 402*f* of FIG. 4A/column 408*b* of FIG. 4B), a source IP address (or other logical address 208*b*) of client network device 102, and a destination IP address (or other logical address 208*b*) of client network device 102.

Figure 5:
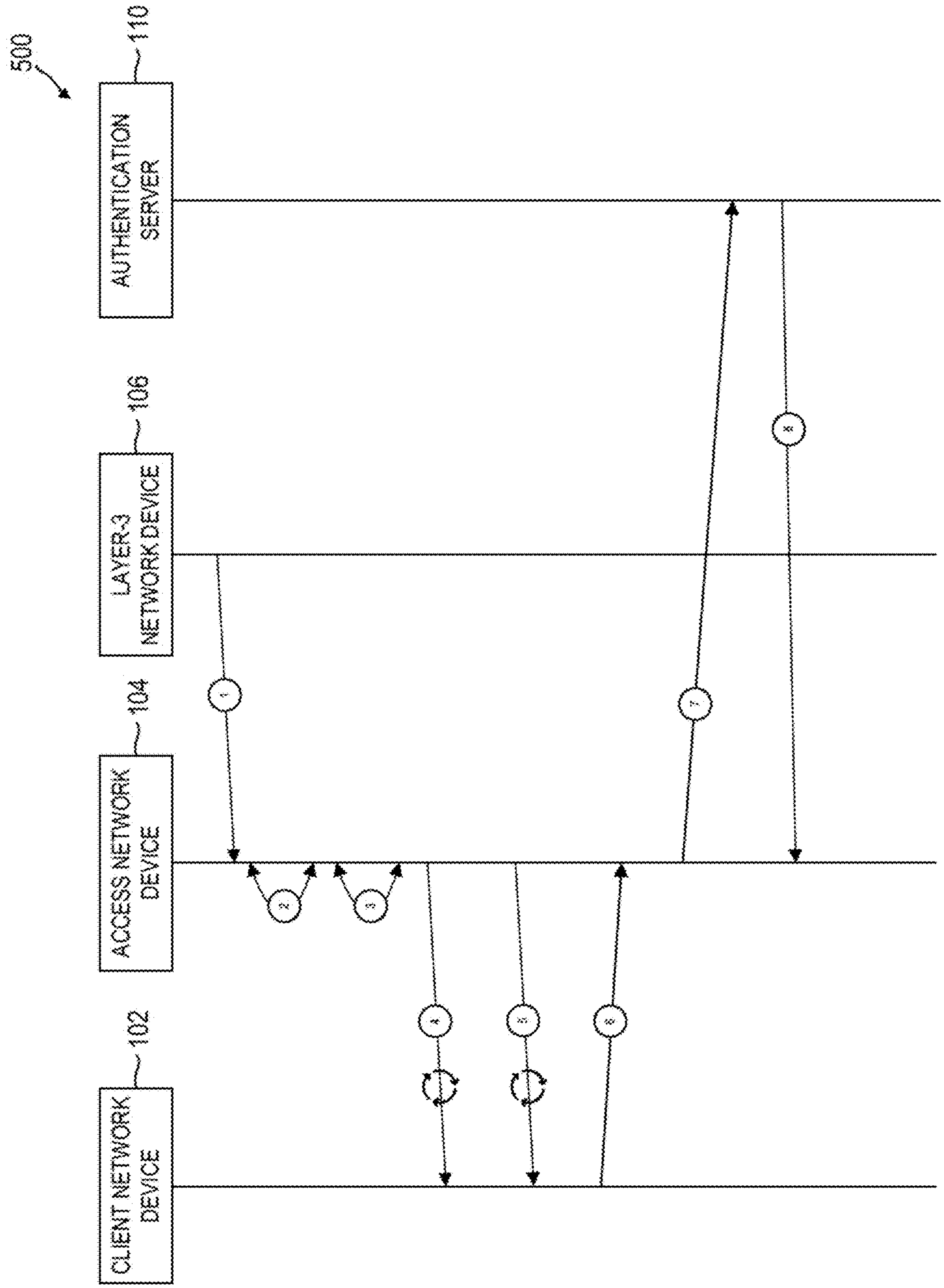
FIG. 5 illustrates an example signaling and operation flow for waking silent network devices for authentication, according to certain implementations.

FIG. 5 illustrates an example signaling flow 500 for waking silent network devices for authentication, according to certain implementations. Flow 500 is described using the examples of the preceding figures, but this disclosure is not limited to such implementations. In the illustrated example, flow 500 involves communication between/among client network device 102, access network device 104, layer-3 network device 106, and authentication server 110. For flow 500, access network device 104 is configured to attempt, according to network information obtained from layer-3 network device 106, to wake a silent client network device 102 that is in an unauthenticated state to cause the silent client network device 102 to provide a physical address 208*a* of the client network device 102 for use in authenticating the client network device 102 (e.g., via authentication server 110) for accessing network 112. For purposes of this example, it will be assumed that client network device 102 initially is a silent network device and is in an unauthenticated state. The following describes steps 1 through 8 of the example signaling flow 500 of FIG. 5.

At step 1, access network device 104 may obtain network information 118(1)/222 from layer-3 network device 106. Network information 118(1)/222 may include information for VLANs that are configured for SDDP, information related to transmission techniques for transmitting silent device discovery messages 224 to silent client network devices 102, information related to attempts that have been made to contact silent client network devices 102, and/or any other suitable information. Layer-3 network device 106 may communicate network information 118(1) to access network device 104 in response to a request from access network device 104 and/or layer-3 network device 106 may push network information 118(1) to access network device 104 at one or more times.

At step 2, access network device 104 may detect a connection to a particular port of access network device 104. The connection may be via a communication link 114 and may be associated with a client network device 102. The client network device 102 may be a silent network device that is in an unauthenticated state.

At step 3, access network device 104 may determine that no physical address 208*a* has been received for the client network device 102 that access network device 104 detected to be connected to the particular port of access network device 104. This may cause access network device 104, configured according to the SDDP, to attempt, according to network information obtained from layer-3 network device 106, to wake a silent client network device 102 that is in an unauthenticated state to cause the silent client network device 102 to provide a physical address 208*a* of the client network device 102 for use in authenticating the client network device 102 (e.g., via authentication server 110) for accessing network 112.

At steps 4-5, access network device 104 may transmit automatically, in response to failure to receive a physical address 208*a* of the client network device 102, a silent device discovery message 224 to the client network device 102 via the particular port. In certain implementations, the silent device discovery message 224 may include an ICMP echo request message or an ARP request. In certain implementations, access network device 104 transmits the silent device discovery message 224 to client network device 102 according to the obtained network information. Access network device 104 may transmit the silent device discovery message 224 to client network device 102 by transmitting one or more silent device discovery messages each transmitted on an unassigned native VLAN of the multiple VLANs and corresponding to another VLAN of the multiple VLANs. Additionally or alternatively, one or more of the silent device discovery messages 224 may be sent on a defined VLAN, such as the previously-described example VLAN 2000.

Access network device 104 may transmit the silent device discovery message 224 using one or more different transmission techniques to attempt to wake up the silent client network device 102. As a first example, access network device 104 may broadcast the silent device discovery message 224 to a subnet associated with client network device 102. As a second example, access network device 104 may transmit the silent device discovery message 224 as a direct silent device discovery message 224 to a subnet associated with client network device 102. As a third example, access network device 104 may transmit a silent device discovery message 224 to a particular range of addresses of a subnet associated with client network device 102. In certain implementations, access network device 104 may transmit the silent device discovery message 224 using two or more of these techniques to attempt to increase the chances of waking up the silent client network device 102 to cause the silent client network device 102 to send the physical address 208*a* (e.g., MAC address) of the silent client network device 102 to access network device 104.

Access network device 104 may transmit the silent device discovery message 224 one or multiple times to attempt to wake up the silent client network device 102. In certain implementations, for any one or more of the above transmission techniques for transmitting silent device discovery messages 224, access network device 104 may transmit the silent device discovery message 224 one or multiple times. In certain implementations, access network device 104 may transmit the silent network device discovery message to client network device 102, using one or more of the above-described and/or other suitable techniques, until the discovery message reply is received from client network device 102 or a termination event occurs. A termination event may include a timeout (e.g., a failure to receive a discovery reply message within a certain amount of time of an initial transmission of a silent device discovery message 224), a particular number of transmissions of silent device discovery message 224 has been attempted, and/or any other suitable type of termination event.

In a particular example, and using the network information 222 of network information table 406 of FIG. 4B as an example, at step 4 and for attempts 1 through 10, access network device 104 may transmit the silent device discovery message on native VLAN masquerading as VLAN 10. For attempt 1, access network device 104 may transmit a silent device discovery message 224 on a native VLAN masquerading as VLAN 10, using a direct ping to IP address 10.0.10.22 with destination MAC address aa: aa: aa: aa: aa: aa. For attempt 2, access network device 104 may transmit a silent device discovery message 224 on native VLAN masquerading as VLAN 10, using a direct ping to IP address 10.0.10.33 with MAC broadcast address ff:ff:ff:ff:ff:ff, as an example. For attempt 3, access network device 104 may transmit a silent device discovery message 224 on native VLAN masquerading as VLAN 10, using a broadcast ping to IP address 10.0.10.255 with MAC broadcast address ff:ff:ff:ff:ff:ff, as an example. For attempts 4 through 10, access network device 104 may transmit a silent device discovery message 224 on native VLAN masquerading as VLAN 10, using pings to IP addresses of IP address range 10.0.10.15 through 10.0.10.20.

Continuing with the particular example, and using the network information 222 of network information table 406 of FIG. 4B as an example, at step 5 and for attempt 11, access network device 104 may transmit the silent device discovery message on native VLAN masquerading as VLAN 30. For attempt 11, access network device 104 may transmit a silent device discovery message 224 on native VLAN masquerading as VLAN 30, using a broadcast ping to IP address 10.0.30.255 and a MAC broadcast address of ff:ff:ff:ff:ff:ff, as an example.

At step 6, client network device 102 transmits, and access network device 104 may receive, a device discovery reply message 226 in response to the silent device discovery message 224, a device discovery reply message 226. The device discovery reply message 226 may be associated with the physical address 208*a* of the client network device 102. In certain implementations, device discovery reply message 226 includes an ICMP echo reply message or an ARP reply. The device discovery reply message 226 may include the physical address 208*a* of the client network device 102. In certain implementations, the physical address 208*a* of the client network device 102 is a MAC address.

At step 7, access network device 104 may initiate authentication of the client network device 102 using the physical address 208*a* of the client network device 102 that was received via the device discovery reply message 226. This disclosure contemplates access network device 104 initiating authentication of client network device 102 using the obtained physical address 208*a* of the client network device 102 in any suitable manner. In certain implementations, access network device 104 may transmit authentication data 228 to authentication server 110 to cause authentication server 110 to attempt to authenticate the client network device 102. The authentication data 228 may be transmitted as an authentication request, such as a RADIUS request. The authentication data 228 may include authentication credentials of client network device 102, which may include the physical address 208*a* of the client network device 102. In certain implementations, access network device 104 may transmit the authentication data 228 to authentication server 110 directly. In certain implementations, access network device 104 may transmit the authentication data 228 to layer-3 network device 106, and layer-3 network device 106 may work with authentication server 110 to attempt to authenticate client network device 102.

At step 8, authentication server 110 may respond with an authentication determination. If authentication server 110 determines that client network device 102 should not be authenticated, then the authentication determination may indicate that authentication is denied. If authentication server 110 determines that client network device 102 should be authenticated, then the authentication determination may indicate that authentication is accepted.

Figure 6:
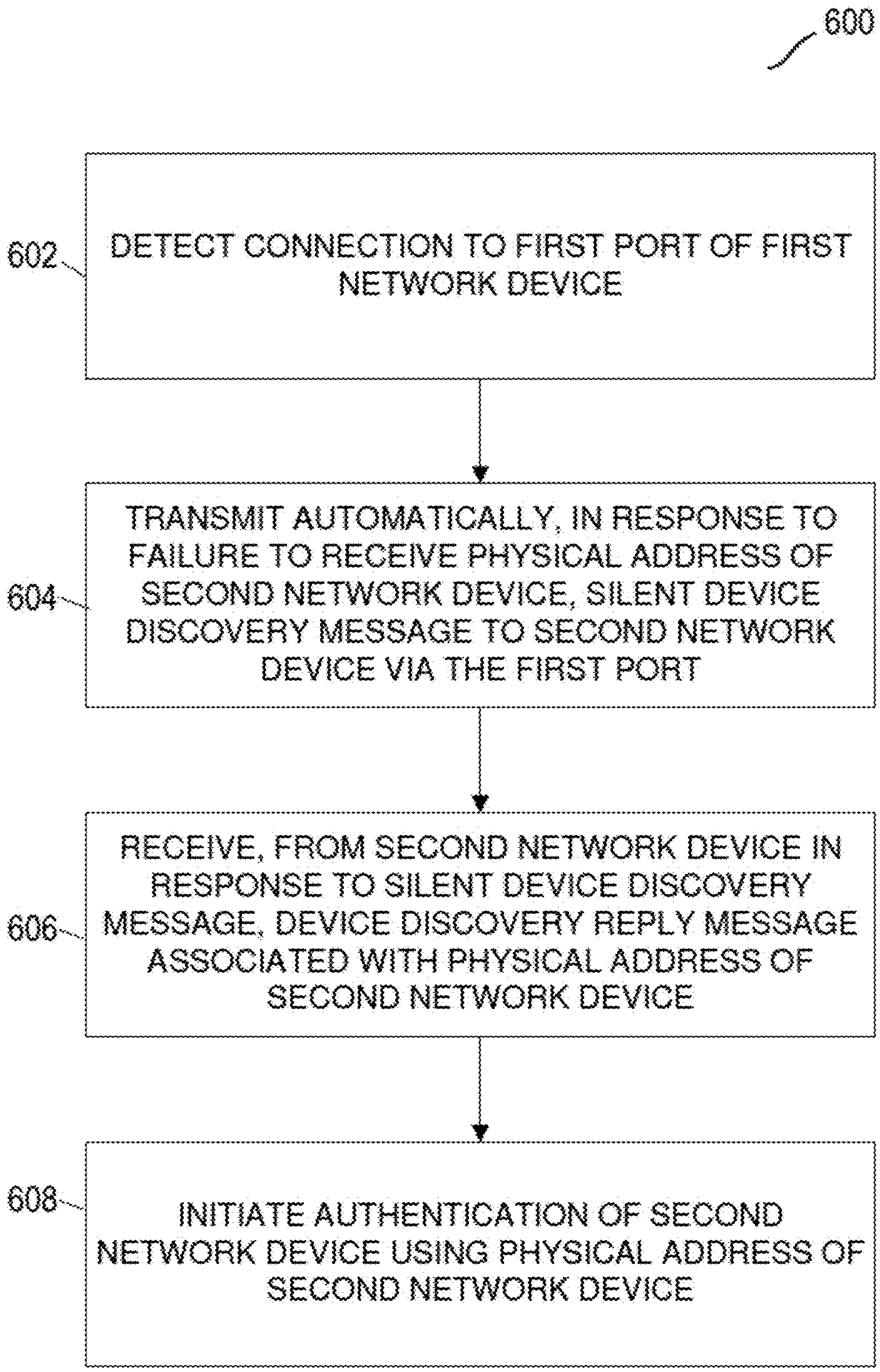
FIG. 6 illustrates an example method for waking silent network devices for authentication, according to certain implementations.
Figure 7:
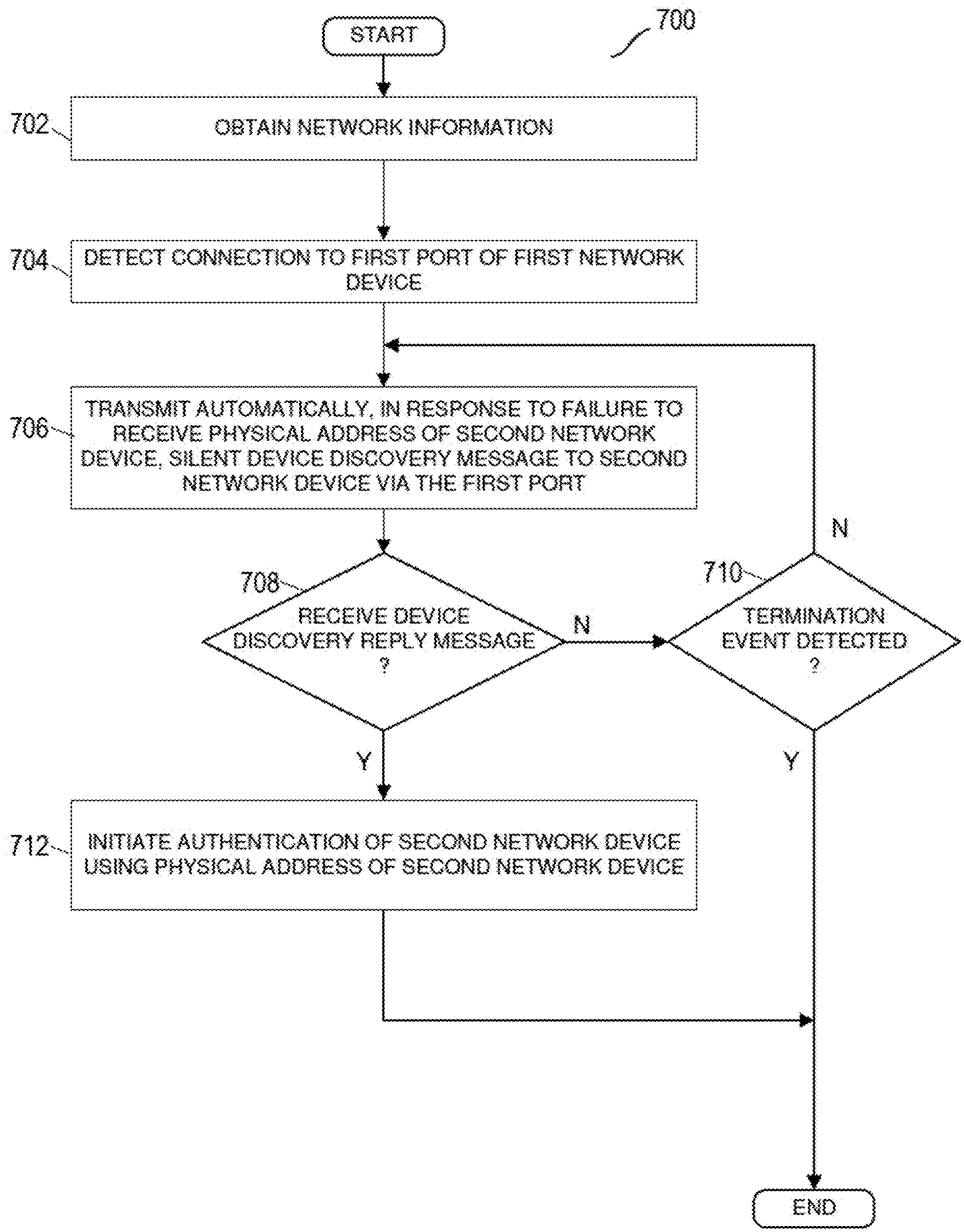
FIG. 7 illustrates an example method for waking silent network devices for authentication, according to certain implementations.

FIGS. 6-7 illustrate various example methods according to certain implementations of this disclosure. In certain implementations, some or all of the operations associated with the methods of FIGS. 6-7 are performed by access network device 104. For example, some or all of the operations associated with the methods of FIGS. 6-7 may be performed by silent device discovery engine 220 of access network device 104. Furthermore, the methods of FIGS. 6-7 are described using the examples of the preceding figures, but this disclosure is not limited to such implementations.

For the method described with reference to FIGS. 6-7, access network device 104 is configured to attempt, according to information obtained from layer-3 network device 106, to wake a silent client network device 102 that is in an unauthenticated state to cause the silent client network device 102 to provide a physical address 208*a* of the client network device 102 for use in authenticating the client network device 102 (e.g., via authentication server 110) for accessing network 112. For purposes of this example operation, it will be assumed that a particular client network device 102 (e.g., referred to simply as client network device 102) initially is a silent network device and is in an unauthenticated state.

FIG. 6 illustrates an example method 600 for waking silent network devices for authentication, according to certain implementations. Example steps of method 600 are described below.

At step 602, access network device 104 may detect a connection to a particular port of access network device 104. The connection may be via a communication link 114 and may be associated with a client network device 102. The client network device 102 may be a silent network device that is in an unauthenticated state.

In certain implementations, a communication network associated with access network device 104 includes multiple VLANs. In certain implementations, access network device 104 may obtain network information 118(1)/222. For example, access network device 104 may obtain network information 118(1)/222 from layer-3 network device 106. The obtained network information may be for VLANs configured for use with the SDDP.

At step 604, access network device 104 may transmit automatically, in response to failure to receive a physical address 208*a* of the client network device 102, a silent device discovery message 224 to the client network device 102 via the particular port. In certain implementations, the silent device discovery message 224 includes an ICMP echo request message or an ARP request. In certain implementations, access network device 104 transmits the silent device discovery message 224 to client network device 102 according to the obtained network information. Access network device 104 may transmit the silent device discovery message 224 to client network device 102 by transmitting one or more silent device discovery messages each transmitted on an unassigned native VLAN of the multiple VLANs and corresponding to another VLAN of the multiple VLANs.

Access network device 104 may transmit the silent device discovery message 224 using one or more different transmission techniques to attempt to wake up the silent client network device 102. As a first example, access network device 104 may broadcast the silent device discovery message 224 to a subnet associated with client network device 102. As a second example, access network device 104 may transmit the silent device discovery message 224 as a direct silent device discovery message 224 to a subnet associated with client network device 102 with a specific destination MAC address or a broadcast MAC address. As a third example, access network device 104 may transmit a silent device discovery message 224 to a particular range of addresses of a subnet associated with client network device 102. In certain implementations, access network device 104 may transmit the silent device discovery message 224 using two or more of these techniques to attempt to increase the chances of waking up the silent client network device 102 to cause the silent client network device 102 to send the physical address 208*a* (e.g., MAC address) of the silent client network device 102 to access network device 104.

Access network device 104 may transmit the silent device discovery message 224 one or multiple times to attempt to wake up the silent client network device 102. In certain implementations, for any one or more of the above transmission techniques for transmitting silent device discovery messages 224, access network device 104 may transmit the silent device discovery message 224 one or multiple times. In certain implementations, access network device 104 may transmit the silent network device discovery message to client network device 102, using one or more of the above-described and/or other suitable techniques, until the discovery message reply is received from client network device 102 or a termination event occurs. A termination event may include a timeout (e.g., a failure to receive a discovery reply message within a certain amount of time of an initial transmission of a silent device discovery message 224), a particular number of transmissions of silent device discovery message 224 has been attempted, and/or any other suitable type of termination event.

At step 606, access network device 104 may receive, from the client network device 102 in response to the silent device discovery message 224, a device discovery reply message 226. The device discovery reply message 226 may be associated with the physical address 208*a* of the client network device 102. In certain implementations, device discovery reply message 226 includes an ICMP echo reply message or a response to the gratuitous ARP. The device discovery reply message 226 may include the physical address 208*a* of the client network device 102. In certain implementations, the physical address 208*a* of the client network device 102 is a MAC address.

At step 608, access network device 104 may initiate authentication of the client network device 102 using the physical address 208*a* of the client network device 102 that was received via the device discovery reply message 226. This disclosure contemplates access network device 104 initiating authentication of client network device 102 using the obtained physical address 208*a* of the client network device 102 in any suitable manner. In certain implementations, access network device 104 may transmit authentication data 228 to authentication server 110 to cause authentication server 110 to attempt to authenticate the client network device 102. The authentication data 228 may be transmitted as an authentication request, such as a RADIUS request. The authentication data 228 may include authentication credentials of client network device 102, which may include the physical address 208*a* of the client network device 102. In certain implementations, access network device 104 may transmit the authentication data 228 to authentication server 110 directly. In certain implementations, access network device 104 may transmit the authentication data 228 to layer-3 network device 106, and layer-3 network device 106 may work with authentication server 110 to attempt to authenticate client network device 102.

FIG. 7 illustrates an example method 700 for waking silent network devices for authentication, according to certain implementations. Example steps of method 700 are described below.

At step 702, access network device 104 may obtain network information 118(1)/222 from layer-3 network device 106. Access network device 104 may request network information 118(1) and/or layer-3 network device 106 may push network information 118(1) to access network device 104 at one or more times. In certain implementations, a communication network associated with access network device 104 includes multiple VLANs. The obtained network information may be for VLANS configured for use with the SDDP.

At step 704, access network device 104 may detect a connection to a particular port of access network device 104. The connection may be via a communication link 114 and may be associated with a client network device 102. The client network device 102 may be a silent network device that is in an unauthenticated state.

At step 706, access network device 104 may transmit automatically, in response to failure to receive a physical address 208*a* of the client network device 102, a silent device discovery message 224 to the client network device 102 via the particular port. In certain implementations, the silent device discovery message 224 includes an ICMP echo request or ARP request message. In certain implementations, access network device 104 transmits the silent device discovery message 224 to client network device 102 according to the obtained network information. Access network device 104 may transmit the silent device discovery message 224 to client network device 102 by transmitting one or more silent device discovery messages each transmitted on an unassigned native VLAN of the multiple VLANs and corresponding to another VLAN of the multiple VLANs.

Access network device 104 may transmit the silent device discovery message 224 using one or more different transmission techniques to attempt to wake up the silent client network device 102. As a first example, access network device 104 may broadcast the silent device discovery message 224 to a subnet associated with client network device 102. As a second example, access network device 104 may transmit the silent device discovery message 224 as a direct silent device discovery message 224 to a subnet associated with client network device 102 with a specific destination MAC address or a broadcast MAC address. As a third example, access network device 104 may transmit a silent device discovery message 224 to a particular range of addresses of a subnet associated with client network device 102. In certain implementations, access network device 104 may transmit the silent device discovery message 224 using two or more of these techniques to attempt to increase the chances of waking up the silent client network device 102 to cause the silent client network device 102 to send the physical address 208*a* (e.g., MAC address) of the silent client network device 102 to access network device 104.

Access network device 104 may transmit the silent device discovery message 224 one or multiple times to attempt to wake up the silent client network device 102. In certain implementations, for any one or more of the above transmission techniques for transmitting silent device discovery messages 224, access network device 104 may transmit the silent device discovery message 224 one or multiple times. In certain implementations, access network device 104 may transmit the silent network device discovery message to client network device 102, using one or more of the above-described and/or other suitable techniques, until the discovery message reply is received from client network device 102 or a termination event occurs. A termination event may include a timeout (e.g., a failure to receive a discovery reply message within a certain amount of time of an initial transmission of a silent device discovery message 224), a particular number of transmissions of silent device discovery message 224 has been attempted, and/or any other suitable type of termination even.

At step 708, access network device 104 may determine whether a device discovery reply message 226 has been received from client network device 102, such as in response to the one or more silent device discovery messages 224 transmitted by access network device 104 at step 706. In certain implementations, determining whether a device discovery reply message 226 has been received from client network device 102 includes determining whether a received device discovery reply message 226 includes a physical address 208*a* (e.g., a MAC address) of client network device 102.

If access network device 104 determines at step 708 that a device discovery reply message 226 has not been received, then at step 710, access network device 104 may determine whether a termination event is detected. In certain implementations, a termination event may include a timeout (e.g., a failure to receive a discovery reply message within a certain amount of time of an initial transmission of a silent device discovery message 224), a particular number of transmissions of silent device discovery message 224 has been attempted, and/or any other suitable type of termination event.

If access network device 104 determines that a termination event is detected, then method 700 may end. If access network device 104 determines that a termination event has not been detected, then method 700 may return to step 706 for access network device 104 to again transmit the silent device discovery message 224 one or multiple times to attempt to wake up the silent client network device 102.

Returning to step 708, if access network device 104 determines that a device discovery reply message 226 has been received, then method 700 may proceed to step 712. The device discovery reply message 226 may be associated with the physical address 208*a* of the client network device 102. In certain implementations, device discovery reply message 226 includes an ICMP echo reply message. The device discovery reply message 226 may include the physical address 208*a* of the client network device 102. In certain implementations, the physical address 208*a* of the client network device 102 is a MAC address.

At step 712, access network device 104 may initiate authentication of the client network device 102 using the physical address 208*a* of the client network device 102 that was received via the device discovery reply message 226. This disclosure contemplates access network device 104 initiating authentication of client network device 102 using the obtained physical address 208*a* of the client network device 102 in any suitable manner. In certain implementations, access network device 104 may transmit authentication data 228 to authentication server 110 to cause authentication server 110 to attempt to authenticate the client network device 102. The authentication data 228 may be transmitted as an authentication request, such as a RADIUS request. The authentication data 228 may include authentication credentials of client network device 102, which may include the physical address 208*a* of the client network device 102. In certain implementations, access network device 104 may transmit the authentication data 228 to authentication server 110 directly. In certain implementations, access network device 104 may transmit the authentication data 228 to layer-3 network device 106, and layer-3 network device 106 may work with authentication server 110 to attempt to authenticate client network device 102.

Figure 8:
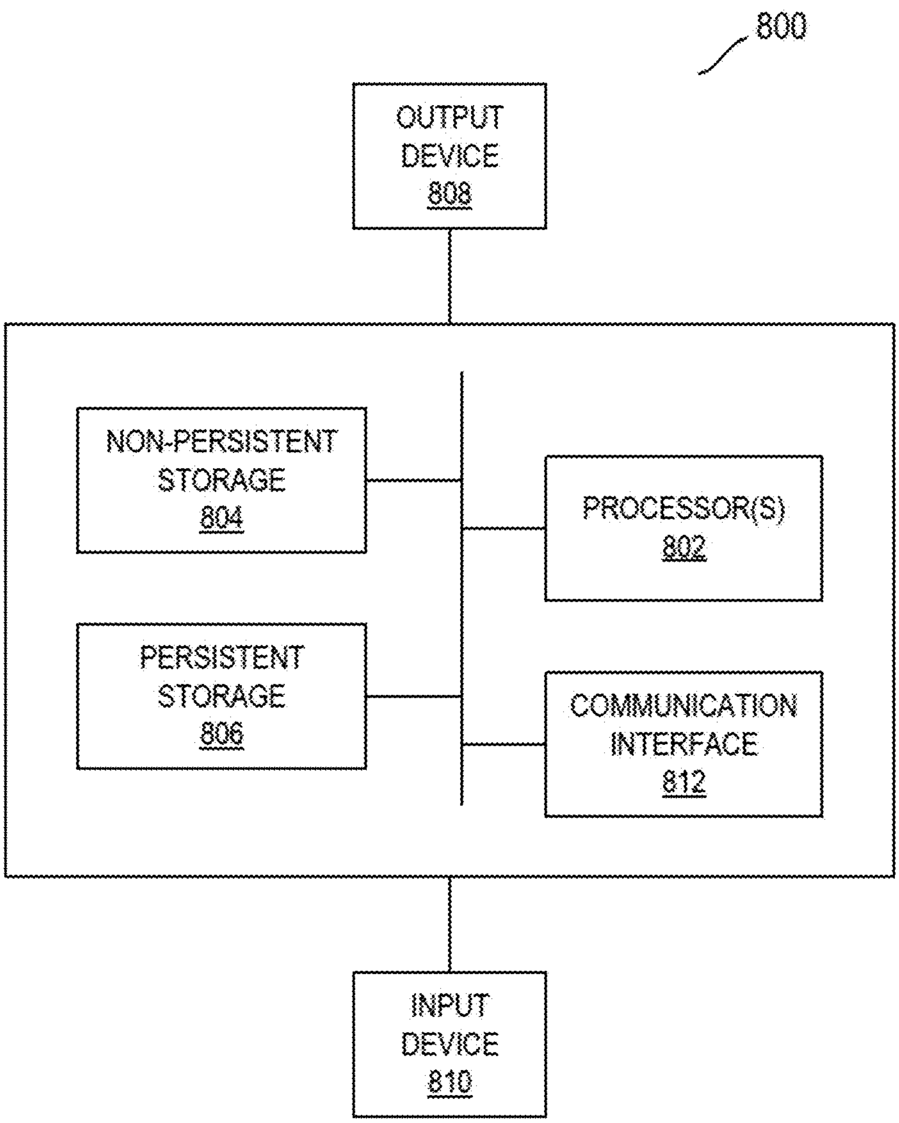
FIG. 8 illustrates a block diagram of an example computer system, according to certain implementations.

FIG. 8 illustrates a block diagram of an example computing device 800, according to certain implementations. As discussed above, implementations of this disclosure may be implemented using computing devices. For example, all or any portion of the components or methods shown in FIGS. 1-7 (e.g., system 100, client network devices 102, access network device 104, layer-3 network device 106, authentication server 110, signaling flow 500, and methods 600 through 700) may be implemented, at least in part, using one or more computing devices such as computing device 800.

Computing device 800 may include one or more computer processors 802, non-persistent storage 804 (e.g., volatile memory, such as RAM, cache memory, etc.), persistent storage 806 (e.g., a hard disk, an optical drive such as a compact disk (CD) drive or digital versatile disk (DVD) drive, a flash memory, etc.), a communication interface 812 (e.g., Bluetooth interface, infrared interface, network interface, optical interface, etc.), input devices 810, output devices 808, and numerous other elements and functionalities. Each of these components is described below.

In certain implementations, computer processor(s) 802 may be an integrated circuit for processing instructions. For example, computer processor(s) may be one or more cores or micro-cores of a processor. Processor 802 may be a general-purpose processor configured to execute program code included in software executing on computing device 800. Processor 802 may be a special purpose processor where certain instructions are incorporated into the processor design. Although only one processor 802 is shown in FIG. 8, computing device 800 may include any number of processors.

Computing device 800 may also include one or more input devices 810, such as a touchscreen, keyboard, mouse, microphone, touchpad, electronic pen, motion sensor, or any other type of input device. Input devices 810 may allow a user to interact with computing device 800. In certain implementations, computing device 800 may include one or more output devices 808, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) 802, non-persistent storage 804, and persistent storage 806. Many different types of computing devices exist, and the aforementioned input and output device(s) may take other forms. In some instances, multimodal systems can allow a user to provide multiple types of input/output to communicate with computing device 800.

Further, communication interface 812 may facilitate connecting computing device 800 to a network (e.g., a LAN, WAN) such as the Internet, mobile network, or any other type of network) and/or to another device, such as another computing device. Communication interface 812 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a Bluetooth® Low Energy (BLE) wireless signal transfer, an IBEACON® wireless signal transfer, a radio frequency identifier (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 812 may also include one or more Global Navigation Satellite System (GNSS) receivers or transceivers that are used to determine a location of the computing device 800 based on receipt of one or more signals from one or more satellites associated with one or more GNSS systems. GNSS systems include, but are not limited to, the US-based global positioning system (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of computing device 800 may be implemented in circuitry. For example, the components can include and/or be implemented using electronic circuits or other electronic hardware, which can include one or more programmable electronic circuits (e.g., microprocessors, graphics processing units (GPUs), digital signal processors (DSPs), CPUs, and/or other suitable electronic circuits), and/or can include and/or be implemented using computer software, firmware, or any combination thereof, to perform the various described operations. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

It should be understood that the systems and methods described in this disclosure may be combined in any suitable manner.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A first network device, comprising:

a plurality of ports;

one or more processors; and one or more non-transitory computer-readable storage media storing programming for execution by the one or more processors, the programming comprising instructions to:

detect a connection to a first port of the plurality of ports, the connection associated with a second network device, the second network device being a silent network device that is in an unauthenticated state;

transmit automatically, in response to failure to receive a physical address of the second network device, a silent device discovery message to the second network device via the first port;

receive, from the second network device in response to the silent device discovery message, a device discovery reply message, the device discovery reply message associated with the physical address of the second network device; and initiate authentication of the second network device using the physical address of the second network device.

2. The first network device of claim 1, wherein:

the silent device discovery message comprises an Internet Control Message Protocol (ICMP) echo request message; and the device discovery reply message comprises an ICMP echo reply message.

3. The first network device of claim 1, wherein:

the silent device discovery message comprises an Address Resolution Protocol Message Protocol (ARP) request message; and the device discovery reply message comprises an ARP reply message.

4. The first network device of claim 1, wherein the device discovery reply message comprises the physical address of the second network device.

5. The first network device of claim 1, wherein the physical address of the second network device is a media access control (MAC) address.

6. The first network device of claim 1, wherein:

the programming further comprises instructions to obtain network information from a Layer-3 network device; and the silent device discovery message is transmitted to the second network device according to the network information.

7. The first network device of claim 1, wherein the programming comprises instructions to transmit the silent device discovery message to the second network device on an unassigned native virtual local area network (VLAN).

8. The first network device of claim 1, wherein:

a communication network associated with the first network device comprises a plurality of virtual local area networks (VLANs); and transmitting the silent device discovery message to the second network device comprises transmitting one or more silent device discovery messages each transmitted on an unassigned native VLAN of the plurality of VLANs and corresponding to another VLAN of the plurality of VLANS.

9. The first network device of claim 1, wherein transmitting the silent device discovery message comprises broadcasting the silent device discovery message to a subnet associated with the second network device.

10. The first network device of claim 1, wherein transmitting the silent device discovery message comprises transmitting the silent device discovery message as a direct silent device discovery message to a subnet associated with the second network device.

11. The first network device of claim 1, wherein transmitting the silent device discovery message comprises transmitting a silent device discovery range to a subnet associated with the second network device.

12. The first network device of claim 1, wherein transmitting the silent device discovery message comprises performing two or more of the following:

broadcasting the silent device discovery message to a subnet associated with the second network device;

transmitting the silent device discovery message as a direct silent device discovery message to a subnet associated with the second network device; or transmitting a silent device discovery range to a subnet associated with the second network device.

13. The first network device of claim 1, wherein:

transmitting automatically, in response to failure to receive a physical address of the second network device, a silent device discovery message to the second network device comprises transmitting one or more silent device discovery messages to the second network device; and the programming further comprises instructions to transmit the one or more silent device discovery messages to the second network device until either:

the discovery message reply is received from the second network device; or a termination event occurs.

14. A computer-implemented method, comprising:

detecting a connection to a first port of a plurality of ports of a first network device, the connection associated with a second network device, the second network device being a silent network device that is in an unauthenticated state;

transmitting automatically, in response to failure to receive a physical address of the second network device, a silent device discovery message to the second network device via the first port;

receiving, from the second network device in response to the silent device discovery message, a device discovery reply message, the device discovery reply message associated with the physical address of the second network device; and initiating authentication of the second network device using the physical address of the second network device.

15. The computer-implemented method of claim 14, wherein:

the silent device discovery message comprises an Internet Control Message Protocol (ICMP) echo request message; and the device discovery reply message comprises an ICMP echo reply message.

16. The computer-implemented method of claim 14, wherein the device discovery reply message comprises the physical address of the second network device.

17. The computer-implemented method of claim 14, wherein:

the method further comprises obtaining, from a Layer-3 network device, network information; and the silent device discovery message is transmitted to the second network device according to the network information.

18. The computer-implemented method of claim 14, comprising transmitting the silent device discovery message to the second network device on an unassigned native virtual local area network (VLAN).

19. The computer-implemented method of claim 14, wherein:

a communication network associated with the first network device comprises a plurality of virtual local area networks (VLANs); and transmitting the silent device discovery message to the second network device comprises transmitting one or more silent device discovery messages each transmitted on an unassigned native VLAN of the plurality of VLANs and corresponding to another VLAN of the plurality of VLANs.

20. One or more non-transitory computer-readable storage media storing programming for execution by the one or more processors, the programming comprising instructions to:

detect a connection to a first port of a plurality of ports of a first network device, the connection associated with a second network device, the second network device being a silent network device that is in an unauthenticated state;

transmit automatically, in response to failure to receive a physical address of the second network device, a silent device discovery message to the second network device via the first port;

receive, from the second network device in response to the silent device discovery message, a device discovery reply message, the device discovery reply message associated with the physical address of the second network device; and initiate authentication of the second network device using the physical address of the second network device.

* * * * *